(12) United States Patent
Turley et al.

(10) Patent No.: US 11,884,837 B2
(45) Date of Patent: Jan. 30, 2024

(54) SCRATCH AND MAR RESISTANT AUTOMOTIVE COATINGS

(71) Applicant: BASF Coatings GmbH, Münster (DE)

(72) Inventors: Kevin Michael Turley, Southfield, MI (US); Paragkumar Thanki, Mangalore (IN); Gajanan Joshi, Pune (IN); Prasad am Ramanna, Mangalore (IN); Donald H Campbell, Southfield, MI (US); Bharathi Rajan, Urwa Chilimbi (IN)

(73) Assignee: BASF COATINGS GMBH, Muenster (DE)

(*) Notice: Subject to any disclaimer, the term of this patent is extended or adjusted under 35 U.S.C. 154(b) by 428 days.

(21) Appl. No.: 16/769,713

(22) PCT Filed: Dec. 7, 2018

(86) PCT No.: PCT/EP2018/083989
§ 371 (c)(1),
(2) Date: Jun. 4, 2020

(87) PCT Pub. No.: WO2019/110808
PCT Pub. Date: Jun. 13, 2019

(65) Prior Publication Data
US 2021/0371697 A1    Dec. 2, 2021

(30) Foreign Application Priority Data
Dec. 7, 2017   (EP) ..................... 17205833

(51) Int. Cl.
| | | |
|---|---|---|
| B05D 1/36 | (2006.01) | |
| B32B 15/092 | (2006.01) | |
| B32B 27/38 | (2006.01) | |
| C09D 133/02 | (2006.01) | |
| C09D 163/00 | (2006.01) | |
| C09D 167/00 | (2006.01) | |
| C09D 133/06 | (2006.01) | |

(52) U.S. Cl.
CPC ....... C09D 167/00 (2013.01); C09D 133/068 (2013.01)

(58) Field of Classification Search
None
See application file for complete search history.

(56) References Cited

U.S. PATENT DOCUMENTS

| | | | |
|---|---|---|---|
| 6,265,073 B1 * | 7/2001 | Nakamura | C09D 163/00 428/447 |
| 6,541,562 B1 * | 4/2003 | Aoki | C09D 201/10 524/588 |
| 9,605,179 B1 | 3/2017 | Jhaveri et al. | |
| 2008/0138627 A1 | 6/2008 | Swarup et al. | |
| 2018/0022941 A1 | 1/2018 | Campbell et al. | |
| 2018/0105717 A1 * | 4/2018 | Swarup | C08F 220/20 |
| 2019/0031910 A1 | 1/2019 | December et al. | |
| 2020/0172758 A1 | 6/2020 | December et al. | |

FOREIGN PATENT DOCUMENTS

| | | | |
|---|---|---|---|
| JP | 11080649 A * | 3/1999 | |
| JP | 2003238895 A * | 8/2003 | |
| JP | 5489559 B2 | 5/2014 | |
| WO | 9700281 A1 | 1/1997 | |
| WO | 02068551 A2 | 9/2002 | |
| WO | 2017125341 A1 | 7/2017 | |
| WO | 2019015953 A1 | 1/2019 | |
| WO | 2019029995 A1 | 2/2019 | |

OTHER PUBLICATIONS

Machine translation of JP-2003238895-A (no date).*
Machine translation of JP-11080649-A (no date).*
International Search Report for corresponding PCT/EP2018/083989 dated Feb. 4, 2019, 10 pages.

* cited by examiner

*Primary Examiner* — Michael J Feely
(74) *Attorney, Agent, or Firm* — Armstrong Teasdale LLP

(57) ABSTRACT

Described herein is a 2K solvent borne coating system. The coating system includes an epoxy component (A), including: i) an epoxy resin; ii)—a solvent; iii)—at least one compound of formula (I):

$$[(ER)_x(R'O)_y(HO)_z(R'')_t(SiO_{(4-x-y-z-t)})]_m \qquad (I)$$

and/or oligomer or polymer compounds of the compound of formula (I), and iv)—optionally, at least one non-catalytic additive; and an acid resin component (B), including: an carboxylic acid resin;
a solvent; optionally, at least one catalyst; and optionally, at least one additive. Also described herein are a 2K coating composition, a method to coat an automotive substrate with the composition, and a scratch and mar resistant coated surface of the 2K coating composition.

15 Claims, No Drawings

SCRATCH AND MAR RESISTANT AUTOMOTIVE COATINGS

CROSS-REFERENCE TO RELATED APPLICATIONS

This application is a U.S. National Phase Application of PCT/EP2018/083989, filed Dec. 7, 2018, which claims the benefit of priority to European Patent Application No. 17205833.1, filed Dec. 7, 2017, the entire contents of which are hereby incorporated by reference herein.

BACKGROUND

The present invention relates to automotive clearcoat compositions containing silane or silicate components which have reduced susceptibility to scratching and marring, methods to apply the coatings, and articles, especially automobiles and other vehicles, comprising the coatings. The cured coatings have epoxy acid crosslinked resin clearcoats and include silane and/or silicate components which provide added crosslinking functionality.

In typical automotive coatings, four or more layers are applied to the metal surface of a vehicle. Although the conventional process is adequate and used commercially worldwide in the automotive industry, due to ever increasing demand for coatings of increased lifetime including improved weather, mar and scratch resistance, there is an ongoing research and development effort to obtain improvement in these parameters. Further, a coating having improved reflow properties where a coating may be treated to restore some or all of its coating quality following a scratch or marring event is sought.

Conventionally, the coating process for a vehicle includes a pretreatment of the body substrate, application of an anti-corrosion layer, a sealer layer, a primer and a topcoat. The pretreatment removes and cleans the surface to enable bonding of the corrosion protection layer which is applied in an electrodeposition operation. A sealer is next applied for the purpose of anti-corrosion, elimination of water leaks and minimization of chipping. A primer is then applied to promote adhesion between the surface and the basecoat to be applied as a component of the topcoat. The primer may also impart a smoother surface for subsequent layers and support the anti-chipping property of the cured coating. Finally, a topcoat that includes a basecoat and clear coat is applied. The basecoat is generally the layer containing the color component while the clear coat provides gloss, smoothness and surface stability including weather resistance, as well as mar and scratch resistance.

Conventional clear coating compositions are available as one component (1K) systems or as two component (2K) systems. The resins employed include acrylic melamine types, polyurethane types and epoxy acid types.

The top-coating compositions may include various additives or chemical modifications to enhance resistance performance to UV degradation, water spotting, scratching and marring. For example, to impart resistance to sunlight fading and UV degradation, combinations of hindered amine light stabilizers (HALS) and ultraviolet absorbers (UVA) may be added.

Environmental etch of the surface results in reduced quality of the surface appearance and results in such appearance defects as water spots and deformation or pitting to the clearcoat surface. Scratch resistance is another factor which affects the appearance of a vehicle's surface over time and exposure. As an example, fine scratches or marring may result from repeated car washing and the mechanical abrasion of the surface such treatment may impart. Such fine scratching may only affect the light reflection of the surface and result in loss of shine or gloss. However, other scratches may cause the clearcoat layer to break exposing the basecoat and actually lead to more extensive damage.

One important property of the clearcoat composition in addition to impact or scratch resistance is the resistance to plastic flow. Plastic flow of the coating under the influence of heat may allow the surface to have a "self-healing" property where fine scratches and other surface defects are minimized or even removed by the reflow of the surface coating. Thus the gloss property of the surface may at least be partially restored due to the occurrence of reflow. Different type of coating compositions have varying reflow character depending upon the chemical nature of the resin, the curing agent employed and other additives present.

It is noted that within the description of the embodiments described, even though the term "topcoat" is used to describe this layer, additional layers may often be applied to the clearcoat topcoat to improve the properties of the coating.

The coatings industry and the automotive industry in particular continues to strive to prepare surface coatings providing good surface appearance, protection and gloss for ever increasing lifetimes. Further, surfaces having "self-healing" reflow properties are also sought.

U.S. Pat. No. 5,814,703 (Yamaya et al.) describes a coating composition containing an organic resin and a silicone oligomer of 3 to 100 Si units. A proportion of the Si units have a hydrocarbon group containing a functional group which may interact with the substrate or the organic resin to enhance the hydrophilic character of the coating and prevent staining from environmental contaminants. The functional groups that may be present include amino groups, mercapto groups, epoxy groups, alkyl halides and alkenyl groups.

U.S. Pat. No. 5,470,616 (Uenishi et al.) describes a shaped article having a silica polycondensate surface coating obtained by cohydrolysis and condensation of a mixture of colloidal silica and at least one type of hydrolyzable silane compound having functional group containing components. The functional groups described include vinyl, mercapto, amino and epoxy groups.

U.S. 2003/0186066 (Monkiewicz et al.) describes a water-free composition containing an epoxy resin, an acrylic resin, a acrylic resin monomer, a copolymer based on an acrylic monomer, a copolymer based on an epoxy monomer and an aminoalkylsilane having a molar ratio of the amino groups of the aminoalkylsilane to the functional acrylate groups of the acrylic resin of less than 7:1. The composition may further contain a silicic ester and at least one alkyl silicate; and/or an organosilane. The coating is an air-drying formulation directed mainly to the coating of aluminum substrates.

U.S. 2006/0079637 (Yaun) describes a primer composition containing a) a cycloaliphatic or polycycloaliphatic epoxy compound; b) an alkoxy silane or silicate reactive diluent; and, c) a curing catalyst. According to the disclosure the curing reaction may include a ring opening polymerization reaction between the epoxy structures of (a) and silanol groups formed on (b) in the presence of atmospheric moisture and acid.

U.S. Pat. No. 6,316,572 (Nambu et al.) describes a top coating composition containing: (A) a resin obtained by mixing an epoxy group-containing compound and a carboxyl group-containing compound and/or a resin based on an epoxy group-containing and carboxyl group-containing vinyl copolymer; (B) a vinyl copolymer having a hydrolyzable silyl group bound to a carbon atom of the polymer chain of formula (I):

and (C) a silicon compound of formula (VII):

$$(R^3O)_{4-b}SiR^4{}_b \quad (VII)$$

and/or a partial hydrolyzate condensate thereof. All the R groups of formulae (I) and (VII) are hydrogen, alkyl, aryl or alkylaryl groups.

U.S. Pat. No. 6,265,073 (Nakamura et al.) describes a top-coating composition containing (A) a resin having epoxy groups, (B) a resin having carboxyl groups, and (C) a silicon compound of formula (I):

$$(R^1O)_{4-a}-SiR^2{}_a \quad (I)$$

wherein the R groups are hydrogen, alkyl, aryl, or aralkyl groups. and a is from 0 to 2.

U.S. Pat. No. 7,790,236 (Vijverberg et al.) describes coating compositions having an epoxy-functional binder and a crosslinker which is reactive with epoxy groups. Loss of gloss is indicated to be a function of crosslink density, the glass transition temperature (Tg) and the profile (width) of the binder Tg in a dynamic mechanical thermal analysis run. Loss of gloss was related to these properties of the coating and to a particular degree of balanced interaction of the three properties. Further, three different types of scratching—elastic, plastic and brittle—are identified and plastic scratches are considered the largest contributor to loss of gloss. Plastic scratching was found to be inversely related to crosslinking density and plastic scratching may be reduced by employing binders having a low onset of Tg and by including extended chain flexible crosslinking groups. The description was only applied to epoxy functional binders and one or more of acid-functional cross-linkers, amino-functional cross-linkers and blocked isocyanate functional cross-linkers.

Producing clearcoat coating compositions having improved stability which provide weather resistance, scratch and mar resistance as well as reflow performance continues to be a challenging problem for the coatings manufacturer.

Scratch resistance of clearcoats crosslinked by epoxy polymers plus carboxylic acid polymers can be weak. Scratch resistance is strongly related to the crosslink density of the final clearcoat. While this can be improved with the addition of catalyst, care must be taken to maintain the clearcoat's stability to storage. This instability problem arises when the reactivity of the crosslinkable groups become significant at low temperatures. This can impact sprayability of the product and appearance and popping resistance. It is typically measured by the increase in viscosity after storage. In order to provide improved crosslink density with adequate storage stability, the co-reactive acid resins and epoxy resins can be separated until immediately prior to application. Such two component clearcoats are known in the automotive industry and can provide improved scratch resistance while maintaining storage stability of the individual components. While their scratch resistance is improved relative to clearcoats with lower catalyst levels (i.e. one component systems), even better scratch resistance is desired.

Addition of silane functional polymer or oligomers or the addition of silicates are also known to improve the scratch resistance of clearcoats. These silane groups will react with other silane groups to form crosslinks. If the silanes contain groups that are reactive with the acid or epoxy resins, then additional crosslinking is possible. However, such systems lack the storage stability that is required to provide commercially viable products.

In the automotive OEM industry, two types of test methods are used to evaluate scratch resistance. In a "wet" method such as the Opel Carwash testing method repeated car washing is emulated while gloss retention relative to an index of number of Rubs applied to the test surface is determined. In dry scratch resistance testing the surface is subjected to an abrasive action of a paper of explicit grit (such as a 9-micron paper supplied by 3M) for a specified period of time. Gloss retention of the abraded surface in comparison to the gloss of the initial unbraided surface is measured.

A further property especially important to automotive coatings is the "reflow" property of the coating. According to this characteristic, clearcoat topcoats may have a property such that when exposed to heat, the coating may exhibit plastic flow and where a surface which contains marring or fine scratching has good reflow property gloss recovery may be observed. Thus a desired coating for an automobile would have high surface hardness to prevent scratching and abrasion while simultaneously having high reflow property such that a marred surface would recover at least a significant portion of its original gloss.

It is generally believed that the properties of surface hardness and high reflow are mutually contradictory and obtaining good performance in one of the two properties leads to less satisfactory performance in the other. Thus, it would be desirable to find shelf-stable clearcoat compositions which when cured provides scratch and mar resistance. Further, a coating having good reflow properties to allow restoration of the original gloss of the coating would be highly desirable.

Thus, one object of the present invention is to provide a storage stable 2K topcoat system which when applied to a basecoat and cured provides a surface of high gloss having scratch and mar resistance as well as having a self-healing reflow property.

A further object of the invention is to provide a method to prepare a topcoat layer for an automotive surface coating wherein the basecoat and clear coat are simultaneously cured to obtain a surface of high gloss having scratch and mar resistance as well as self-healing reflow property.

A further object is to provide an automotive substrate coated with the clearcoat composition having scratch and mar resistance as well as self-healing reflow property.

BRIEF SUMMARY OF THE INVENTION

These and other objects are provided according to the present invention, the first embodiment of which includes a 2K solvent borne coating system, comprising: an epoxy component (A), comprising: i) an epoxy resin; ii) a solvent; iii) at least one compound of formula (I):

$$[(ER)_x(R'O)_y(HO)_z(R'')_t(SiO_{(4-x-y-z-t)})]_m \quad (I)$$

wherein ER is an alkyl group substituted with an epoxide group or a cycloalkyl group substituted with an epoxide group, R' is an alkyl group of 1 to 6 carbon atoms, R" is an alkyl group of 1 to 20 carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; and iv) optionally, at least one additive; and an acid resin component (B), comprising: an carboxylic acid resin; a solvent; optionally, at least one catalyst; and optionally, at least one additive.

In an aspect of the first embodiment, the at least one compound of formula (I) comprises a compound of formula (Ia):

(ER)$_x$(R'O)$_y$Si  (Ia)

wherein x is 1 or 2, y is 2 or 3, and x+y=4.

In another aspect of the first embodiment, the at least one compound of formula (I) comprises a compound of formula (Ib):

(R'O)$_y$Si  (Ib)

wherein y is 4.

In a further aspect of the first embodiment, the at least one compound of formula (I) comprises a compound of formula (Ic):

(R'O)$_y$(R")$_t$Si  (Ic)

wherein y is 2 or 3, and t is 1 or 2.

In a second embodiment, a 2K solvent borne coating composition is included. The composition comprises: an epoxy resin; a carboxylic acid resin; a solvent; optionally, a catalyst; optionally, an additive; and at least one compound of formula (I):

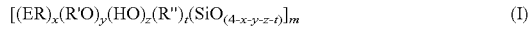
[(ER)$_x$(R'O)$_y$(HO)$_z$(R")$_t$(SiO$_{(4-x-y-z-t)}$)]$_m$  (I)

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; wherein a total % by mass content of the at least one compound of formula (I) is from 5 to 50% of the total mass of solids of the solvent borne coating composition.

In an aspect of this second embodiment the compound of formula (I) comprises a compound of formula (Ia):

(ER)$_x$(R'O)$_y$Si  (Ia)

wherein x is 1 or 2, y is 2 or 3, and x+y=4.

In a further aspect of the second embodiment, the compound of formula (I) comprises a compound of formula (Ib):

(R'O)$_y$Si  (Ib)

wherein y is 4.

In a further aspect of the second embodiment, the compound of formula (I) comprises a compound of formula (Ic):

(R'O)$_y$(R")$_t$Si  (Ic)

wherein y is 2 or 3, and t is 1 or 2.

In another embodiment, the present invention includes a wet-coated substrate, comprising: a substrate; optionally, a primer coating on the substrate; a wet basecoat coating; and a solvent borne 2K clearcoat wet coating on the wet basecoat: wherein the solvent borne 2K wet coating comprises: an epoxy resin; a carboxylic acid resin; a solvent; optionally, a catalyst; optionally, an additive; and at least one compound of formula (I):

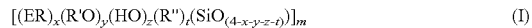
[(ER)$_x$(R'O)$_y$(HO)$_z$(R")$_t$(SiO$_{(4-x-y-z-t)}$)]$_m$  (I)

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; wherein a total % by mass content of the at least one compound of formula (I) is from 5 to 50% of the total mass of solids of the solvent borne coating composition.

In an aspect of the wet coating embodiment, the at least one compound of formula (I) comprises a compound of formula (Ia):

(ER)$_x$(R'O)$_y$Si  (Ia)

wherein x is 1 or 2, y is 2 or 3, and x+y 4.

In a further aspect of the wet coated embodiment, the compound of formula (I) comprises a compound of formula (Ib):

(R'O)$_y$Si  (Ib)

wherein y is 4.

In a further aspect of the wet coated embodiment, the compound of formula (I) comprises a compound of formula (Ic):

(R'O)$_y$(R")$_t$Si  (Ic)

wherein y is 2 or 3, and t is 1 or 2.

In a first method embodiment, the present invention includes a method to coat a substrate, comprising: i) preparing a 2K coating composition by combining and mixing an epoxy component (A), comprising: an epoxy resin; a solvent; at least one compound of formula (I):

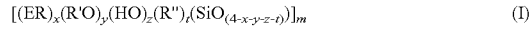
[(ER)$_x$(R'O)$_y$(HO)$_z$(R")$_t$(SiO$_{(4-x-y-z-t)}$)]$_m$  (I)

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; and optionally, at least one additive; and an acid resin component (B), comprising: a carboxylic acid resin; a solvent; optionally, at least one catalyst; and optionally, at least one additive; ii) applying the 2K coating composition to a substrate; and iii) drying and curing the applied composition on the substrate.

In a further method embodiment, the present invention includes a method to coat a substrate, comprising: i) preparing a 2K coating composition by combining and mixing an epoxy component (A), comprising: an epoxy resin; a solvent; at least one compound of formula (Ib):

 (Ib)

wherein y is 4; and optionally, at least one non-catalytic additive; and an acid resin component (B), comprising: a carboxylic acid resin; a solvent; optionally, at least one catalyst; and optionally, at least one additive; ii) applying the 2K coating composition to a substrate; and iii) drying and curing the applied composition on the substrate.

In one aspect of the method embodiments described above, the 2K coating composition is applied onto a wet basecoat composition and the basecoat and 2K coating compositions are simultaneously dried and cured.

In a further aspect of this method embodiment the substrate comprises a metal and the metal substrate comprises an electrocoated layer on the metal surface. Also included is the method wherein a basecoat is applied to the electrocoated layer; followed by applying the 2K composition to the wet basecoat composition to obtain wet on wet layers of the basecoat and 2K composition; and drying and curing the wet on wet layers.

The foregoing description is intended to provide a general introduction and summary of the present invention and is not intended to be limiting in its disclosure unless otherwise explicitly stated. The presently preferred embodiments, together with further advantages, will be best understood by reference to the following detailed description and Examples.

DETAILED DESCRIPTION OF THE EMBODIMENTS

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. The term "storage stable" according to the present invention describes that the composition can be stored at ambient temperature for six months without substantial increase of viscosity and without settling of solids. Further, the pH change during storage is 1 pH unit or less. The term (meth)acrylate as used herein is generic and includes both acrylate structures and methacrylate structures. All other terms are interpreted according to the conventional meaning understood by one of skill in the art.

When addressing the problem of improved stability of clearcoat compositions containing silane components it would not be expected that a two-component approach would be successful because the silane or silicate groups react with other silane or silicate groups. However, the inventors have surprisingly discovered that by combining these silane or silicate groups into the epoxy component of a two-component acid plus epoxy clearcoat, improved scratch resistance and stability may be obtained.

In the first embodiment, the present invention provides a storage stable 2K solvent borne coating system, comprising: an epoxy component (A), comprising: i) an epoxy resin; ii) a solvent; iii) at least one compound of formula (I):

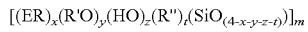 (I)

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; and iv) optionally, at least one additive; and an acid resin component (B), comprising: an carboxylic acid resin; a solvent; optionally, at least one catalyst; and optionally, at least one additive.

The 2K clear coat compositions (A) and (B) of the present invention are solvent borne compositions and may contain any of the solvents conventionally known. Solvents which may be suitable include aromatic solvents, such as toluene, xylene, naphtha, and petroleum distillates; aliphatic solvents, such as heptane, octane, and hexane; ester solvents, such as butyl acetate, isobutyl acetate, butyl propionate, ethyl acetate, isopropyl acetate, amyl acetate, hexyl acetate, heptyl acetate, ethyl propionate, isobutylene isobutyrate, ethylene glycol diacetate, and 2-ethoxyethyl acetate; ketone solvents, such as acetone, methyl ethyl ketone, methyl amyl ketone, and methyl isobutyl ketone; lower alcohols, such as methanol, ethanol, isopropanol, n-butanol, 2-butanol; glycol ethers such as ethylene glycol monobutyl ether, diethylene glycol butyl ether; glycol ether esters such as propylene glycol monomethyl ether acetate, ethylene glycol butyl ether acetate, 3-methoxy n-butyl acetate; lactams, such as N-methyl pyrrolidone (NMP); and mixtures thereof. In certain embodiments the solvent may be a VOC exempt solvent such as chlorobromomethane, 1-bromopropane, $C_{12-18}$ n-alkanes, t-butyl acetate, perchloroethylene, benzotrifluoride, p-chlorobenzotrifluoride, acetone, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane.

The solvent of the epoxy composition (A) and the solvent of the acid resin composition (B) may be the same or may be any combination of solvents which are mutually compatible. Lower alcohols and combinations of lower alcohols may be preferred solvents due to good volatility and low cost.

The epoxy resin component of the epoxy composition (A) may be any of the epoxy resins conventionally known in the trade. For example, acrylic resins having an epoxy group in a side chain may be obtained by copolymerization of (meth) acrylic monomers and glycidyl group containing unsaturated monomers. Examples of epoxy group containing unsaturated monomer may include but are not limited to glycidyl acrylate, glycidyl methacrylate, 3,4-epoxycyclohexyl methylacrylate, and 3,4-epoxycyclohexyl methylmethacrylate.

The epoxy group content unsaturated monomer (b) may be independent, or may be two or more kinds of mixtures. Comonomers may include one or more of methyl acrylate, ethyl acrylate, propyl acrylate, butyl acrylate, cyclohexyl acrylate, 2-ethylhexyl acrylate, methyl methacrylate, ethyl methacrylate, propyl methacrylate, butyl methacrylate, cyclohexyl methacrylate, and 2-ethylhexyl methacrylate.

The epoxy resin component of the 2K system contains at least one compound of formula (I):

$$[(ER)_x(R'O)_y(HO)_z(R'')_t(SiO_{(4-x-y-z-t)})]_m \quad (I)$$

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m.

In some embodiments, the compound of formula (I) may be a compound of formula (Ia):

$$(ER)_x(R'O)_y Si \quad (Ia)$$

wherein x is 1 or 2, y is 2 or 3, and x+y=4. Examples of compounds of formula (Ia) include but are not limited to epoxide compounds such as Gamma-glycidoxypropyltrimethoxysilane, Gamma-glycidoxypropylmethyldiethoxysilane, Beta-(3,4-epoxycyclohexyl)ethyl-trimethoxysilane, and Gamma-glycidoxypropyltrimethoxy silane.

In some embodiments, the compound of formula (I) may be a compound of formula (Ib):

$$(R'O)_y Si \quad (Ib)$$

wherein y is 4. Examples of compounds of formula (Ib) include but are not limited to tetramethoxy silane, tetraethoxysilane, tetrapropoxy silane, tetrabutoxy silane, tetrapentoxy silane and tetrahexoxy silane.

In some embodiments, the compound of formula (I) may be a compound of formula (Ic):

$$(R'O)_y(R'')_t Si \quad (Ic)$$

wherein y is 2 or 3, and t is or 2.

Examples of compounds of formula (Ic) include but are not limited to alkyl or alkenyl substituted silanes such as methyltrimethoxysilane, ethyltrimethoxysilane, n-propyltrimethoxysilane, isopropyltrimethoxysilane, n-butyltrimethoxysilane, cyclohexyltrimethoxysilane, allyltrimethoxysilane. One of skill recognizes that the hydrolyzable group of the silane may be any of methoxy, ethoxy, propoxy or other groups readily displaceable from the Si bond. Further, R" may be an alkylene oxide ether chain such as polyethyleneoxy or polybutyleneoxy.

These examples are exemplary of the possible substitution possible through the R" units of formula (Ic) and one of skill recognizes that coating surface properties may be modified or altered according to the functionality, hydrophobicity or hydrophilicity of the R" group employed.

Moreover, further oligomer or polymer compounds are included in formula (I) wherein partial hydrolysis and condensation provides structures containing epoxy side chains (ER).

It is understood that the composition according to formula (I) may contain multiple combinations of compounds according to formulae (Ia), (Ib) and (Ic).

The epoxy resin component (A) may further contain one or more additives including stabilizers, solubilizers, diluents, wetting agents, rheology control agents, pigments, dyes, defoamers, dispersing agents, UV absorbers, hindered amine light stabilizers and adhesion promoters. In a preferred aspect, the additive is not capable to catalyze hydrolysis and/or condensation of the silane component or epoxy groups.

In one special aspect, the epoxy component may contain a hydrophobic fumed silica which may also contribute to improvement in scratch and mar resistance. Generally, the fumed silicas of interest have a $SiO_2$ content of 9928% by weight, a BET surface area from 90 to 245 $m^2/g$, a pH as a 4 wt. % aqueous dispersion of 3.0 to 7.5 and a tapped density of from about 50 to about 200 g/l. In one special composition, a fumed silica having a BET surface area of 150-190 $m^2/g$, a pH of 3.0 to 5.0 and a tapped density of greater than 100 g/l, preferably greater than 150 g/l and most preferably greater than 180 g/l is included in the epoxy component. The content of the fumed silica in the epoxy component may be from 0 to 30% by weight, preferably 5 to 26% by weight and most preferably 10 to 22% by weight based on the total weight of the epoxy component (A).

The acid resin composition (B) contains at least one resin having functional groups reactive to epoxide groups. Any such resin conventionally known may be employed. In certain embodiments, the resin having functional groups reactive to epoxide groups may be a (meth)acrylate polymer or polyester polymer having carboxylic acid groups. Examples of such resins include but are not limited to (meth)acrylate resins containing as copolymerized monomers acrylic acid, methacrylic acid, crotonic acid, fumaric acid, maleic acid and itaconic acid.

Polyesters having acid functional groups may be prepared by reacting: (a) polycarboxylic acids or their esterifiable derivatives, with (b) polyols and optionally, other modifying components in a ratio such that the number of carboxyl groups exceeds the number of hydroxyl groups. Examples of polycarboxylic acids and their esterifiable derivatives may include but are not limited to phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexane-discarboxlic acid, 1,4-cyclohexane-dicarboxylic acid, 4-methylhexahydrophthalic acid, endomethylenetetrahydropthalic acid, tricyclodecanedicarboxlic acid, endoethylenehexahydropthalic acid, camphoric acid, cyclohexanetetracarboxylic acid, and cyclobutanetetracarboxylic acid. The cycloaliphatic polycarboxylic acids may be employed either in their cis or in their trans form or as a mixture of the two forms. Esterifiable derivatives of these polycarboxylic acids include their single or multiple esters with aliphatic alcohols having 1 to 4 carbon atoms or hydroxy alcohols having up to 4 carbon atoms, preferably the methyl and ethyl ester, as well as the anhydrides of these polycarboxylic acids, where they exist. Examples of polyols may include but are not limited to ethylene glycol, butylene glycol, neopentyl glycol, propanediols, butanediols, hexanediols, diethylene glycol, cyclohexanediol, cyclohexanedimethanol, trimethylpentanediol, ethylbutylpropanediol ditrimethylolpropane, trimethylolethane, trimethylolpropane, glycerol, pentaerythritol, dipentaerythritol, tris-hydroxyethyl isocyanate, polyethylene glycol, polypropylene glycol, and polyols derived from natural oils.

The acid resin composition (B) may optionally contain a catalyst to promote reaction of the epoxy and carboxylic resin groups in the crosslinking and curing operations. The metal catalysts are conventionally known and may be an organometallic compound selected from aliphatic bismuth carboxylates such as bismuth ethylhexanoate, bismuth subsalicylate (having an empirical formula $C_7H O_4Bi$), bismuth hexanoate, bismuth ethylhexanoate or dimethylol-propionate, bismuth oxalate, bismuth adipate, bismuth lactate, bismuth tartarate, bismuth salicylate, bismuth glycolate, bismuth succinate, bismuth formate, bismuth acetate, bismuth acrylate, bismuth methacrylate, bismuth propionate, bismuth butyrate, bismuth octanoate, bismuth decanoate, bismuth stearate, bismuth oleate, bismuth eicosanoate, bismuth benzoate, bismuth malate, bismuth maleate, bismuth neodecanoate, bismuth phthalate, bismuth citrate, bismuth gluconate; bismuth acetylacetonate; bis-(triorgano tin)oxides such as bis(trimethyl tin) oxide, bis(triethyl tin) oxide, bis(tripropyl tin) oxide, bis(tributyl tin) oxide, bis(triamyl tin) oxide, bis(trihexyl tin) oxide, bis(triheptyl tin) oxide, bis(trioctyl tin) oxide, bis(tri-2-ethylhexyl tin) oxide, bis (triphenyl tin) oxide, bis(triorgano tin)sulfides, (triorgano tin)(diorgano tin) oxides, sulfoxides, and sulfones, bis(triorgano tin)dicarboxylates such as bis(tributyl tin) adipate and maleate; bis(triorgano tin)dimercaptides, triorgno tin salts such as trioctyl tin octanoate, tributyl tin phosphate; (triorgano tin)(organo tin)oxide; trialkylalkyloxy tin oxides such as trimethylmethoxy tin oxide, dibutyl tin diacetylacetonate, dibutyl tin dilaurate; trioctyl tin oxide, tributyl tin oxide, dialkyl tin compounds such as dibutyl tin oxide, dioctyl tin oxide, dibutyl tin dilaurate, dibutyl tin diacetate, dibutyl tin dimaleate, dibutyl tin distearate, dipropyl tin dioctoate and dioctyl tin oxide; monoalkyl tin compounds such as monobutyltin trioctanoate, monobutyl tin triacetate, monobutyl tin tribenzoate, monobutyl tin trioctylate, Monobutyltin trilaurate, monobutyl tin trimyristate, monomethyl tin triformate, monomethyl tin triacetate, monomethyl tin trioctylate, monooctyl tin triacetate, monooctyl tin trioctylate, monooctyl tin trilaurate; monolauryl tin triacetate, monolauryl tin trioctylate, and monolauryl tin trilaurate; zinc octoate, zinc naphthenate, zinc tallate, zinc carboxylates having from about 8 to 14 carbons in the carboxylate groups, zinc acetate; lithium carboxylates such as lithium acetate, lithium 2-ethylhexanoate, lithium naphthenate, lithium butyrate, lithium isobutyrate, lithium octanoate, lithium neodecanoate, lithium oleate, lithium versatate, lithium tallate, lithium oxalate, lithium adipate, lithium stearate; lithium hydroxide; zirconium alcoholates, such as methanolate, ethanolate, propanolate, isopropanolate, butanolate, tert-butanolate, isobutanolate, pentanolate, neopentanolate, hexanolate and octanolate; zirconium carboxylates such as formate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate and phenylacetate; zirconium 1,3-diketonates such as acetylacetonate (2,4-pentanedionate), 2,2,6,6-tetramethyl-3,5-heptanedionate, 1,3-diphenyl-1,3-propanedionate (dibenzoylmethanate), 1-phenyl-1,3-butananedionate and 2-acetylcyclohexanonate; zirconium oxinate; zirconium 1,3-ketoesterates, such as methyl acetoacetate, ethyl acetoacetate, ethyl-2-methyl acetoacetate, ethyl-2-ethyl acetoacetate, ethyl-2-hexylacetoacetate, ethyl-2-phenyl-acetoacetate, propyl acetoacetate, isopropyl acetoacetate, butyl acetoacetate, tert-butyl acetoacetate, ethyl-3-oxo-valerate, ethyl-3-oxo-hexanoate, and 2-oxo-cyclohexane carboxylic acid ethyl esterate; zirconium 1,3-ketoamidates, such as N,N-diethyl-3-oxo-butanamidate, N,N-dibutyl-3-oxo-butanamidate, N,N-bis-(2-ethylhexyl)-3-oxo-butanamidate, N,N-bis-(2-methoxyethyl)-3-oxo-butanamidate, N,N-dibutyl-3-oxo-heptanamidate, N,N-bis-(2-methoxyethyl)-3-oxo-heptanamidate, N,N-bis-(2-ethylhexyl)-2-oxo-cyclopentane carboxamidate, N,N-dibutyl-3-oxo-3-phenylpropanimidate, N,N-bis-(2-methoxyethyl)-3-oxo-3-phenylpropanimidate; and combinations of the foregoing metal catalysts.

In certain aspects the acid resin component (B), may contain at least one catalyst selected from the group consisting of bismuth neodecanoate, dibutyltin laurate (DBTL), ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

The acid resin component (B) may further contain one or more additives selected from the group consisting of titanium dioxide, precipitated silica, pyrogenic (fumed) silica, talc, mica, stabilizers, solubilizers, diluents, wetting agents, rheology control agents, pigments, dyes, defoamers, dispersing agents, UV absorbers, hindered amine light stabilizers and adhesion promoters.

It may be useful to include the hydrophobic fumed silica described previously as a component of the epoxy resin component to the acid resin component (B).

In another embodiment, a 2K solvent borne coating composition obtained by combining and mixing the epoxy component (A) and the acid resin component (B) is included. The solvent borne composition, comprises: an epoxy resin; a carboxylic acid resin; a solvent; optionally, a catalyst; optionally, an additive; and at least one compound of formula (I):

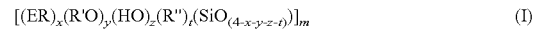
$$[(ER)_x(R'O)_y(HO)_z(R'')_t(SiO_{(4-x-y-z-t)})]_m \qquad (I)$$

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; wherein a total % by mass content of the at least one compound of formula (I) is from 5 to 50% of the total mass of solids of the solvent borne coating composition.

The components of the coating composition are as previously described.

In certain aspects of the 2K solvent borne coating composition, the compound of formula (I) may include one or more compounds of formulae (Ia), (Ib) and (Ic):

$$(ER)_x(R'O)_y Si \qquad (Ia)$$

wherein x is 1 or 2, y is 2 or 3, and x+y=4;

$$(R'O)_y Si \qquad (Ib)$$

wherein y is 4;

$$(R'O)_y(R'')_t Si \qquad (Ic)$$

wherein y is 2 or 3, and t is 1 or 2.

The solvent of the composition may be one or more of those previously described and in certain embodiments may be at least one selected from the group consisting of toluene, xylene, naphtha, heptane, octane, hexane; butyl acetate, isobutyl acetate, butyl propionate, ethyl acetate, isopropyl acetate, amyl acetate, hexyl acetate, heptyl acetate, ethyl propionate, isobutylene isobutyrate, ethylene glycol diacetate, 2-ethoxyethyl acetate, acetone, methyl ethyl ketone, methyl amyl ketone, and methyl isobutyl ketone, methanol, ethanol, isopropanol, n-butanol, 2-butanol, ethylene glycol monobutyl ether, diethylene glycol butyl ether, propylene glycol monomethyl ether acetate, ethylene glycol butyl ether acetate, 3-methoxy n-butyl acetate, N-methyl pyrrolidone (NMP), chlorobromomethane, 1-bromopropane, $C_{12-18}$ n-alkanes, t-butyl acetate, perchloroethylene, benzotrifluoride, p-chlorobenzotrifluoride, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4-nonafluorobutane, and 2-(ethoxydifluoromethyl)-1,1,1,2,3,3,3-heptafluoropropane.

In certain select embodiments, the solvent is a polar organic solvent. For example, the solvent may be a polar aliphatic solvent or polar aromatic solvent. Among useful solvents are ketone, ester, acetate, aprotic amide, aprotic sulfoxide, and aprotic amine solvents. Examples of specific useful solvents include ketones, such as acetone, methyl ethyl ketone, methyl amyl ketone, methyl isobutyl ketone, esters such as ethyl acetate, butyl acetate, pentyl acetate, ethyl ethoxypropionate, ethylene glycol butyl ether acetate, propylene glycol monomethyl ether acetate, aliphatic and/or aromatic hydrocarbons such as toluene, xylene, solvent naphtha, and mineral spirits, ethers such as glycol ethers like propylene glycol monomethyl ether, alcohols such as ethanol, propanol, isopropanol, n-butanol, isobutanol, and tert-butanol, nitrogen-containing compounds such as N-methyl pyrrolidone and N-ethyl pyrrolidone, and combinations of these.

The solvent in the coating composition may be present in an amount of from about 0.01 weight percent to about 99 weight percent, or in an amount of from about 10 weight percent to about 60 weight percent, or in an amount of from about 30 weight percent to about 50 weight percent.

The catalyst of the solvent borne 2K coating composition may be any of those previously described for the 2K coating system and in certain embodiments the catalyst may contain one or more compounds selected from the group consisting of dibutyltin laurate (DBTL), bismuth neodecanoate, ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

If present, the amount of the metal catalyst included in the solvent borne clear coat composition may be from 0.01 to 10 percent by weight, preferably from 0.05 to 7.5 percent by weight, and more preferably from 1.0 to 5.0 percent by weight, based on the total weight of solids in the coating composition. The compatibility and stability of the catalyst containing compositions may require special techniques to incorporate the catalyst as may be determined by one of skill in the art.

The additive of the solvent borne coating composition may be at least one selected from the group consisting of titanium dioxide, precipitated silica, pyrogenic silica, talc, mica, stabilizers, solubilizers, diluents, wetting agents, rheology control agents, pigments, dyes, defoamers, dispersing agents, UV absorbers, hindered amine light stabilizers and adhesion promoters.

If either or both of the (A) and (B) components contain the hydrophobic fumed silica this will then be present in the solvent borne clear coat composition and depending on content may vary from 0 to 25% by weight of the solvent borne clear coat composition.

In another embodiment, the invention includes a wet-coated substrate (which may be referred to as "wet-on-wet coating") comprising: a substrate; optionally, a primer coating on the substrate; a wet basecoat coating; and a solvent borne 2K clearcoat wet coating on the wet basecoat; wherein the solvent borne 2K wet coating comprises: an epoxy resin; a carboxylic acid resin; a solvent; optionally, a catalyst; optionally, an additive; and at least one compound of formula (I):

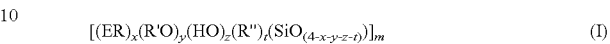

$$[(ER)_x(R'O)_y(HO)_z(R'')_t(SiO_{(4-x-y-z-t)})]_m \qquad (I)$$

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; wherein a total % by mass content of the at least one compound of formula (I) is from 5 to 50% of the total mass of solids of the solvent borne coating composition.

The coated substrate may contain one or more of a metal, a metal alloy, a metal compound and a thermoplastic polymer. The metal may be or may comprise at least one metal selected from the group consisting of aluminum, aluminum alloys, steel, steel alloys, magnesium and magnesium alloys. Oxides, nitrides and carbides of these may also be present. In certain aspects the substrate may be bare steel, phosphated steel, or galvanized steel.

In certain aspects wherein the substrate is a metal alloy or metal compound the substrate surface may comprise an electrocoated layer.

The substrate may be first primed with an electrodeposition (electrocoat) primer. The electrodeposition composition can be any electrodeposition composition conventionally known or used for example in automotive vehicle coating operations. Non-limiting examples of electrocoat compositions include electrocoating compositions sold by BASF. Electrodeposition coating baths usually comprise an aqueous dispersion or emulsion including a principal film-forming epoxy resin having ionic stabilization (e.g., salted amine groups) in water or a mixture of water and organic co-solvent. Emulsified with the principal film-forming resin is a crosslinking agent that can react with functional groups on the principal resin under appropriate conditions, such as with the application of heat, and so cure the coating. Suitable examples of crosslinking agents, include, without limitation, blocked polyisocyanates. The electrodeposition coating compositions usually include one or more pigments, catalysts, plasticizers, coalescing aids, antifoaming aids, flow control agents, wetting agents, surfactants, UV absorbers, HALS compounds, antioxidants, and other additives.

The electrodeposition coating composition may be applied to a dry film thickness of 10 to 35 μm. The coating may be cured under appropriate conditions, for example by baking at from about 135° C. to about 190° C. for between about 15 and about 60 minutes.

The thermoplastic polymer employed as substrate material may be at least one polymer is selected from the group consisting of a polycarbonate, a polyolefin, a polyamide, a polyurethane, a polyester, a polycarbonate, an acrylonitrile-butadiene-styrene (ABS) copolymer, and an EPDM rubber.

Such polymeric substrates may be fiber-filled or reinforced as conventionally known or may be pigmented for coloration. Further, the polymeric substrate may be coated with a primer coating composition as is known in the art.

In certain aspects of the wet-on-wet coating, the compound of formula (I) of the 2K solvent borne clearcoat coating may include one or more compounds of formulae (Ia), (Ib) and (Ic) as previously described:

$$(ER)_x(R'O)_y Si \quad \quad (Ia)$$

wherein x is 1 or 2, y is 2 or 3, and x+y=4;

$$(R'O)_y Si \quad \quad (Ib)$$

wherein y is 4;

$$(R'O)_y(R'')_t Si \quad \quad (Ic)$$

wherein y is 2 or 3, and t is 1 or 2.

The solvent of the solvent borne 2K clearcoat wet coating may be one or more of those previously described and in certain embodiments may be at least one selected from the group consisting of toluene, xylene, naphtha, heptane, octane, hexane; butyl acetate, isobutyl acetate, butyl propionate, ethyl acetate, isopropyl acetate, amyl acetate, hexyl acetate, heptyl acetate, ethyl propionate, isobutylene isobutyrate, ethylene glycol diacetate, 2-ethoxyethyl acetate, acetone, methyl ethyl ketone, methyl amyl ketone, and methyl isobutyl ketone, methanol, ethanol, isopropanol, n-butanol, 2-butanol, ethylene glycol monobutyl ether, diethylene glycol butyl ether, propylene glycol monomethyl ether acetate, ethylene glycol butyl ether acetate, 3-methoxy n-butyl acetate, N-methyl pyrrolidone (NMP), chlorobromomethane, 1-bromopropane, $C_{12-16}$ n-alkanes, t-butyl acetate, perchloroethylene, benzotrifluoride, p-chlorobenzotrifluoride, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane.

In certain select embodiments, the solvent is a polar organic solvent. For example, the solvent may be a polar aliphatic solvent or polar aromatic solvent. Among useful solvents are ketone, ester, acetate, aprotic amide, aprotic sulfoxide, and aprotic amine solvents. Examples of specific useful solvents include ketones, such as acetone, methyl ethyl ketone, methyl amyl ketone, methyl isobutyl ketone, esters such as ethyl acetate, butyl acetate, pentyl acetate, ethyl ethoxypropionate, ethylene glycol butyl ether acetate, propylene glycol monomethyl ether acetate, aliphatic and/or aromatic hydrocarbons such as toluene, xylene, solvent naphtha, and mineral spirits, ethers such as glycol ethers like propylene glycol monomethyl ether, alcohols such as ethanol, propanol, isopropanol, n-butanol, isobutanol, and tert-butanol, nitrogen-containing compounds such as N-methyl pyrrolidone and N-ethyl pyrrolidone, and combinations of these.

When additives are present in the clear coat of the wet-on-wet coating, any conventionally known and employed may be used. In certain aspects the additive may be one or more additives selected from the group consisting of titanium dioxide, precipitated silica, pyrogenic silica, talc, mica, stabilizers, solubilizers, diluents, wetting agents, rheology control agents, pigments, dyes, defoamers, dispersing agents, UV absorbers, hindered amine light stabilizers and adhesion promoters.

As previously described one special aspect may be where the clear coat of the wet-on-wet coating contains a hydrophobic fumed silica. In a preferred form of this special aspect, the hydrophobic fumed silica has a BET surface area of 150-190 $m^2/g$, a pH of 3.0 to 5.0 and a tapped density of greater than 100 g/l, preferably greater than 150 g/l and most preferably greater than 180 g/l.

Customary coating additives agents which may be included, are, for example, surfactants, stabilizers, wetting agents, dispersing agents, adhesion promoters, UV absorbers, hindered amine light stabilizers such as HALS compounds, benzotriazoles or oxanilides; free-radical scavengers; slip additives; defoamers; reactive diluents, of the kind which are common knowledge from the prior art; wetting agents such as siloxanes, fluorine compounds, carboxylic monoesters, phosphoric esters, polyacrylic acids and their copolymers, for example polybutyl acrylate, or polyurethanes; adhesion promoters such as tricyclodecanedimethanol; flow control agents; film-forming assistants such as cellulose derivatives; rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium and sodium-magnesium-fluorine-lithium phyllosilicates of the montmorillonite type; silicas such as Aerosils®; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates; and flame retardants. As one of ordinary skill recognizes, combinations of additives may be employed to obtain target performance properties of the composition or the cured coating.

When a catalyst is present in the clear coat of the wet-on-wet coating, any of the catalysts previously described or conventionally known may be used. In certain aspects, the catalyst may be selected from the group consisting of dibutyltin laurate (DBTL), bismuth neodecanoate, ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

As described above, the basecoat is the layer wherein color and other special effects may be applied to the substrate. Accordingly, the basecoat composition may contain colorants, pigments and fillers, including special effect pigments. Nonlimiting examples of special effect pigments that may be utilized in the basecoat include metallic, pearlescent, and color-variable effect flake pigments. Metallic basecoat colors may be produced using metallic flake pigments like aluminum flake pigments, coated aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance (degree of reflectance or color) when viewed at different angles. Metal flakes may be cornflake type, lenticular, or circulation-resistant; micas may be natural, synthetic, or aluminum-oxide type. The flake pigments are typically satisfactorily dispersed in the composition by stirring under low shear. The content of the flake pigment or pigments may be from 0.01 wt. % to about 0.3 wt. % or about 0.1 wt. % to about 0.2 wt. %, in each case based on total solids weight of the composition.

Nonlimiting examples of other suitable pigments and fillers that may be utilized in the 1K basecoat composition include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barites, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, nanoparticles based on silicon dioxide, aluminum oxide, zirconium oxide, and so on. The pigment(s) and any filler(s) are preferably dispersed with a pigment dispersant according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments and fillers may be utilized in amounts typically of up to about 60% by weight, based on total weight of the coating composition. The amount of pigment used depends on the nature of the pigment and on the depth of the color and/or the intensity of the effect it is intended to produce, and also by the dispersibility of the pigments in the pigmented coating composition. The pigment content, based in each case on the total weight of the pigmented coating composition, is preferably 0.5% to 50%, more preferably 1% to 30%, very preferably 2% to 20%, and more particularly 2.5% to 10% by weight.

Other additives that may be present in the basecoat composition may include stabilizers, wetting agents, rheology control agents, dispersing agents, UV absorbers, hindered amine light stabilizers and adhesion promoters. Any one or more of such additives may be included depending on the performance properties sought by the coating formulator. If present, the additives may be present in an amount of from 0.1 to 5 percent by weight, preferably from 0.5 to 4 percent by weight, and more preferably from 0.5 to 2.5 percent by weight, based on the total weight of solids in the compositions.

In a further embodiment, the present invention includes a coated substrate obtained by drying and curing the wet coated substrates previously described. In one aspect the cured coating comprises: optionally, a dried and cured primer coating on the substrate; a dried and cured basecoat; and a dried and cured clearcoat, wherein the dried and cured clearcoat contains a crosslinked resin reaction product of an epoxy resin and a carboxylic acid resin; wherein the crosslinked resin comprises side chain units of silanyl hydroxy ester groups obtained by reaction of a carboxyl group of the carboxylic acid resin or an epoxy group of the epoxy resin with a compound selected from the group of compounds consisting of compounds of formula (I), compounds of formula (Ia), compounds of formula I(b), compounds of formula (Ic) and compounds of formula (Id).

In one special aspect, may be where the cured clear coat of the coating contains a hydrophobic fumed silica. In a preferred form of this special aspect, the hydrophobic fumed silica has a BET surface area of 150-190 m²/g, a pH of 3.0 to 5.0 and a tapped density of greater than 100 g/l, preferably greater than 150 g/l and most preferably greater than 180 g/l. As shown in the data of Table 2, the inventors have surprisingly discovered that the presence of the fumed silica in the cured clearcoat provides a coating which has significantly increased gloss retention after reflow. The data indicates a synergistic effect is obtained with such compositions containing the fumed silica which could not have been expected.

In another embodiment, the present invention provides a method to coat a substrate, comprising:

i) Preparing a 2K Coating Composition by Combining and Mixing:

an epoxy component (A), comprising: an epoxy resin; a solvent; at least one compound of formula (I):

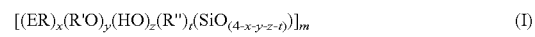

wherein ER is an alkyl group substituted with an epoxide group or a cycloalkyl group substituted with an epoxide group, R' is an alkyl group of 1 to 6 carbon atoms, R" is an alkyl group of 1 to carbon atoms which may be linear, branched or cyclic, x is a number from 0 to 2, y is a number from 0 to 4, z is a number from 0 to 3, t is a number from 0 to 2, at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; and optionally, at least one non-catalytic additive; and an acid resin component (B), comprising: a carboxylic acid resin; a solvent; optionally, at least one catalyst; and optionally, at least one additive;

ii) Applying the 2K Coating Composition to a Substrate; and iii) Drying and Curing the Applied Composition on the Substrate.

The substrate for the coating method was previously described and that description is referenced and included with regard to the present coating method.

Additionally, as previously described, the compound of formula (I) may be or may include one or more compounds of formulae (Ia), (Ib) and (Ic):

wherein x is 1 or 2, y is 2 or 3, and x+y=4;

wherein y is 4;

wherein y is 2 or 3, and t is 1 or 2.

Further, in one special aspect of the method the epoxy component (A), the acid resin component (B) or both components (A) and (B) may contain a hydrophobic fumed silica. In a preferred form of this special aspect, the hydrophobic fumed silica has a BET surface area of 150-190 m²/g, a pH of 30 to 5.0 and a tapped density of greater than 100 g/l, preferably greater than 150 g/l and most preferably greater than 180 g/l.

In one aspect of the coating method, the 2K coating composition may be applied onto a wet basecoat composition and the basecoat and 2K coating composition may be simultaneously dried and cured.

In a further aspect, the coating method includes applying a basecoat layer to the electrocoated layer; applying the 2K composition to the wet basecoat composition to obtain wet on wet layers of the basecoat and 2K composition; and drying and curing the wet on wet layers.

An additional further aspect of the coating method may include a 3-wet layering process wherein the primer coating, basecoat and clearcoat are applied as wet layers and then the three wet on wet layers may be cured simultaneously. This method may be conducted with water based primers and basecoats or solvent based primers and basecoats. According to the present method where a water based primer and basecoat is employed, the water based primer may optionally be heated flashed before the basecoat is applied. The water based primer and basecoat coating may optionally also be exposed to a heat flash before the clearcoat is applied. Solvent primers and basecoats may be flashed at ambient temperatures.

The coating compositions may be applied to the substrate by any conventionally known techniques, including, for example, spray coating, dip coating, roll coating, curtain coating, knife coating, spreading, pouring, dipping, impregnating, trickling or rolling, and the like. For automotive body panels, spray coating methods such as compressed-air spraying, airless spraying, high-speed rotation, electrostatic spray application, alone or in conjunction with hot spray application such as hot-air spraying, may be employed.

The coating compositions may be applied in both single-stage and multistage coating methods, particularly in methods where a pigmented basecoat or monocoat coating layer is first applied to an uncoated or precoated substrate and afterward another coating layer may optionally be applied when the pigmented film is a basecoat coating.

The applied coating compositions may be cured after a certain rest time or "flash" period. The rest time serves, for example, for the leveling and devolatilization of the coating films or for the evaporation of volatile constituents such as solvents. The rest time may be assisted or shortened by the application of elevated temperatures or by a reduced humidity, provided this does not entail any damage or alteration to the coating films, such as premature complete crosslinking, for instance. The thermal curing of the coating compositions may be accomplished with conventional methods such as heating in a forced-air oven or irradiation with IR lamps. The thermal cure may also take place in stages. Another preferred curing method is that of curing with near infrared (NIR) radiation. Although various methods of curing may be used, heat curing is preferred. Generally, heat curing is effected by exposing the coated article to elevated temperatures provided primarily by radiative heat sources. After application, the applied coating layer or wet-on wet layers may be cured, for example with heat at temperatures from 30 to 200° C., or from 40 to 190° C., or from 50 to 180° C., for a time of 1 min up to 10 hr, more preferably 2 min up to 5 hr, and in particular 3 min to 3 hr.

In one form of this aspect, the substrate may comprise a metal and the metal substrate may be electrocoated on the metal surface as previously described.

In a second further aspect wherein the substrate comprises a thermoplastic polymer the coating method may include applying a primer coating to a surface of the thermoplastic substrate; optionally, drying and curing the primer coating on the thermoplastic substrate; applying a basecoat layer to the primer coating layer; applying the 2K composition to the wet basecoat composition to obtain wet on wet layers of the basecoat, the 2K composition and optionally the primer coating; and drying and curing the wet on wet layers. This may further include a 3-wet coating method as previously described.

The coatings obtained according to the present invention in each and all of the described embodiments and aspects thereof are particularly useful for use in automotive OEM coatings and provide finished coatings having significantly improved scratch and mar resistance compared to conventional epoxy-acid clearcoat coatings.

In the automotive OEM industry, two types of test methods are used to evaluate scratch and mar resistance. In a "wet" method such as the Opel Carwash testing method repeated car washing is emulated while gloss retention relative to an index of number of Rubs applied to the test surface is determined. In dry scratch resistance testing the surface is subjected to an abrasive action of a paper of explicit grit (such as a 9-micron paper supplied by 3M) for a specified period of time. Gloss retention of the abraded surface in comparison to the gloss of the initial unabraded surface is measured.

A further property especially important to automotive coatings is the "reflow" property of the coating. According to this characteristic, clearcoat topcoats may have a property such that when exposed to heat, the coating may exhibit plastic flow and where a surface which contains marring or fine scratching has good reflow property gloss recovery may be observed. Thus, a desired coating for an automobile would have high surface hardness to prevent scratching and abrasion while simultaneously having high reflow property such that a marred surface would recover at least a significant portion of its original gloss.

The actual test methods employed for the testing of these properties are described in the Example section.

The testing results for the Examples shows that coatings according to the embodiments of the present invention have higher Tukon Hardness and yet have greater reflow gloss recovery than a coating not containing a component derived from compounds of formula I. Such simultaneous increase in hardness and reflow provides significant improvement in the surface properties of the coatings according to the embodiments described herein. The data from the experiments is shown in Tables 1 and 2 (White Basecoat and Black Basecoat data from X-cel file).

Significantly, as indicated in Table 2, the inventors believe that a synergistic effect may be obtained with coating formulations including a mixture of epoxy and silane components according to formulae (I), (Ia), (Ib) and (Ic) and oligomer or polymer compounds of the compound of formula (I), wherein partial hydrolysis and condensation provides structures containing epoxy side chains (ER), said structures containing up to 5000 monomeric units m. Thus, in Table 2, Example 5, being a mixture of 3-GPTMS and TEOS without catalyst, shows a 70% retention of gloss, compared to 64% for 3-GPTMS alone and 58% for TEOS alone. Similarly, the gloss retention after reflow for the mixed components for Example 5 was 89% compared to 86% for 3-GPTMS alone and 80% for TEOS alone.

Further, as shown in Example 10, significant improvement in gloss retention and gloss retention after reflow (98%) may be obtained when a fumed silica is included in the clearcoat composition according to the embodiments. This synergistic improvement effect could not have been predicted and is an unexpected and significant property.

When a catalyst was included gloss retention and gloss retention after reflow is increased for the Examples according to the embodiments of the invention. Again, a synergistic effect may also be observed. Thus, in Table 2, Example 8, being a mixture of 3-GPTMS (Silquest A-187 (Beta-(3,4-Epoxycyclohexyl)ethyltrimethoxysilane) and TEOS (tetraethoxysilane) with catalyst, shows a 72% retention of gloss, compared to 70% for 3-GPTMS alone and 71% for TEOS alone. Similarly, the gloss retention after reflow for the mixed components for Example 8 was 91% compared to 91% for 3-GPTMS alone and 86% for TEOS alone.

This synergistic effect obtained with mixed compositions including multiple components according to formulae (I), (Ia), (Ib) and (Ic) and oligomer or polymer compounds of the compound of formula (I), wherein partial hydrolysis and condensation provides structures containing epoxy side chains (ER), said structures containing up to 5000 monomeric units m could not have been predicted in advance of this work and is therefore, unexpected. Further, the synergistic increase for gloss retention and gloss retention after reflow especially where a catalyst is not included is a significant improvement.

Not wishing to be bound by theory, the inventors believe that such combinations of compounds of Formulae Ia, Ib and/or Ic and/or oligomer or polymer compounds of the compound of formula (I), wherein partial hydrolysis and condensation provides structures containing epoxy side chains (ER), said structures containing up to 5000 monomeric units m lead to a multiplicity of crosslinking structures as and lead to the enhanced combination of hardness and reflow properties obtained.

Thus, the specific embodiments and various aspects of the invention include the following elements.

In a first embodiment, the present invention provides a 2K solvent borne coating system, comprising:
an epoxy component (A), comprising:
i) an epoxy resin;
ii) a solvent;
iii) at least one compound of formula (I):

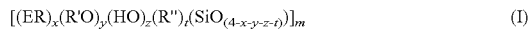   (I)

wherein
ER is an alkyl group substituted with an epoxide group or a cycloakyl group substituted with an epoxide group,
R' is an alkyl group of 1 to 6 carbon atoms,
R" is an alkyl group of 1 to 20 carbon atoms which may be linear, branched or cyclic,
x is a number from 0 to 2,
y is a number from 0 to 4, z is a number from 0 to 3,
t is a number from 0 to 2,
at least one of x and y is greater than 0, x+y+z+t=4, and m is =1, and/or oligomer or polymer compounds of the compound of formula (I),
wherein partial hydrolysis and condensation provides structures containing epoxy side chains (ER), said structures containing up to 5000 monomeric units n; and
iv) optionally, at least one additive; and
an acid resin component (B), comprising:
a carboxylic acid resin;
a solvent;
optionally, at least one catalyst; and
optionally, at least one additive.

In a first aspect of the first embodiment the present invention provides a 2K solvent borne coating system wherein the at least one compound of formula (I) comprises a compound of formula (Ia):

   (Ia)

wherein
x is 1 or 2,
y is 2 or 3, and
x+y=4.

In further description of the first aspect the compound of formula (Ia) comprises at least one epoxide compound selected from the group consisting of Gamma-glycidoxypropyltrimethoxysilane, Gamma-glycidoxypropylmethyldiethoxysilane, Beta-(3,4-epoxycyclohexyl)ethyltrimethoxysilane, and Gamma-glycidoxypropyltrimethoxy silane.

In a second aspect of the first embodiment the at least one compound of formula (I) comprises a compound of formula (Ib):

   (Ib)

wherein y is 4.

In further description of the second aspect the compound of formula (Ib) comprises at least one silane compound selected from the group consisting of tetramethoxysilane, tetraethoxysilane, tetrapropoxysilane and tetrahexoxysilane.

In a third aspect of the first embodiment the at least one compound of formula (I) comprises a compound of formula (Ic):

   (Ic)

wherein y is 2 or 3, and t is 1 or 2.

In one special aspect of the first embodiment, at least one of the epoxy component (A) and the acid resin component (B) contains a hydrophobic fumed silica.

In a further part of this special aspect, the hydrophobic fumed silica has a BET surface area of 150-190 $m^2/g$, a pH of 3.0 to 5.0 and a tapped density of greater than 100 g/l, preferably greater than 150 g/l and most preferably greater than 180 g/l.

In further description of the first embodiment, the solvent of the epoxy component (A) and/or the solvent of the acid resin component (B) is at least one selected from the group consisting of toluene, xylene, naphtha, heptane, octane, hexane; butyl acetate, isobutyl acetate, butyl propionate, ethyl acetate, isopropyl acetate, amyl acetate, hexyl acetate, heptyl acetate, ethyl propionate, isobutylene isobutyrate, ethylene glycol diacetate, 2-ethoxyethyl acetate, acetone, methyl ethyl ketone, methyl amyl ketone, and methyl isobutyl ketone, methanol, ethanol, isopropanol, n-butanol, 2-butanol, ethylene glycol monobutyl ether, diethylene glycol butyl ether, propylene glycol monomethyl ether acetate, ethylene glycol butyl ether acetate, 3-methoxy n-butyl acetate, N-methyl pyrrolidone (NMP), chlorobromomethane, 1-bromopropane, $C_{12-18}$ n-alkanes, t-butyl acetate, perchloroethylene, benzotrifluoride, p-chlorobenzotrifluoride, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane.

In further description of the first embodiment the epoxy resin component (A) comprises a non-catalytic additive and the non-catalytic additive is selected from the group consisting of stabilizers, solubilizers, diluents, wetting agents, rheology control agents, pigments, dyes, defoamers, dispersing agents, UV absorbers, hindered amine light stabilizers and adhesion promoters.

In further description of the first embodiment the acid resin component (B), comprises at least one catalyst and the catalyst is selected from the group consisting of dibutyltin laurate (DBTL), ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

In further description of the first embodiment the acid resin component (B) comprises an additive and the additive is selected from the group consisting of titanium dioxide, precipitated silica, pyrogenic silica, talc, mica, stabilizers, solubilizers, diluents, wetting agents, rheology control agents, pigments, dyes, defoamers, dispersing agents, UV absorbers, hindered amine light stabilizers and adhesion promoters.

In a second embodiment, the present invention provides a 2K solvent borne coating composition, comprising:
an epoxy resin;
a carboxylic acid resin;
a solvent;
optionally, a catalyst;
optionally, an additive; and
at least one compound of formula (I):

$$[(ER)_x(R'O)_y(HO)_z(R'')_t(SiO_{(4-x-y-z-t)})]_m \quad (I)$$

wherein
ER is an alkyl group substituted with an epoxide group or a cycloalkyl group substituted with an epoxide group,
R' is an alkyl group of 1 to 6 carbon atoms,
R'' is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0,
x+y+z+t=4, and
m is =1 and/or oligomer or polymer compounds of the compound of formula (I), wherein partial hydrolysis and condensation provides structures containing epoxy side chains (ER), said structures containing up to 5000 monomeric units m;
wherein a total % by mass content of the at least one compound of formula (I) is from 5 to 50% of the total mass of solids of the solvent borne coating composition.

In a first aspect of the second embodiment the at least one compound of formula (I) comprises a compound of formula (Ia):

$$(ER)_x(R'O)_y Si \quad (Ia)$$

wherein
x is 1 or 2,
y is 2 or 3, and
x+y=4.

In further description of the first aspect of the second embodiment the compound of formula (Ia) comprises at least one epoxide compound selected from the group consisting of Gamma-glycidoxypropyltrimethoxysilane, Gamma-glycidoxypropylmethyldiethoxysilane, Beta-(3,4-epoxycyclohexyl)ethyltrimethoxysilane, and Gamma-glycidoxypropyltrimethoxy silane.

In a second aspect of the second embodiment the at least one compound of formula (I) comprises a compound of formula (Ib):

$$(R'O)_y Si \quad (Ib)$$

wherein y is 4.

In further description of the second aspect of the second embodiment the compound of formula (Ib) comprises at least one silane compound selected from the group consisting of tetramethoxysilane, tetraethoxysilane, tetrapropoxysilane and tetrahexoxysilane.

In a third aspect of the second embodiment the at least one compound of formula (I) comprises a compound of formula (Ic):

$$(R'O)_y(R'')_t Si \quad (Ic)$$

wherein y is 2 or 3, and t is 1 or 2.

In a special aspect of the second embodiment the 2K solvent borne coating composition, comprises a hydrophobic fumed silica. In a preferred form of this special aspect, the hydrophobic fumed silica has a BET surface area of 150-190 m²/g, a pH of 3.0 to 5.0 and a tapped density of greater than 100 g/l, preferably greater than 150 g/l and most preferably greater than 180 g/l.

In further description of the second embodiment the solvent comprises at least one selected from the group consisting of toluene, xylene, naphtha, heptane, octane, hexane; butyl acetate, isobutyl acetate, butyl propionate, ethyl acetate, isopropyl acetate, amyl acetate, hexyl acetate, heptyl acetate, ethyl propionate, isobutylene isobutyrate, ethylene glycol diacetate, 2-ethoxyethyl acetate, acetone, methyl ethyl ketone, methyl amyl ketone, and methyl isobutyl ketone, methanol, ethanol, isopropanol, n-butanol, 2-butanol, ethylene glycol monobutyl ether, diethylene glycol butyl ether, propylene glycol monomethyl ether acetate, ethylene glycol butyl ether acetate, 3-methoxy n-butyl acetate, N-methyl pyrrolidone (NMP), chlorobromoethane, 1-bromopropane, $C_{12-18}$ n-alkanes, t-butyl acetate, perchloroethylene, benzotrifluoride, p-chlorobenzotrifluoride, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane.

In further description of the second embodiment the additive comprises at least one selected from the group consisting of titanium dioxide, precipitated silica, pyrogenic silica, talc, mica, stabilizers, solubilizers, diluents, wetting agents, rheology control agents, pigments, dyes, defoamers, dispersing agents, UV absorbers, hindered amine light stabilizers and adhesion promoters.

In a fourth aspect of the second embodiment the 2K solvent borne coating composition comprises a catalyst and the catalyst is selected from the group consisting of dibutyltin laurate (DBTL), ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

In a third embodiment, the invention provides a wet-coated substrate, comprising:
a substrate;
optionally, a primer coating on the substrate;
a wet basecoat coating; and
a solvent borne 2K clearcoat wet coating on the wet basecoat:
wherein the solvent borne 2K wet coating comprises:
an epoxy resin;
a carboxylic acid resin;
a solvent;
optionally, a catalyst;
optionally, an additive; and
at least one compound of formula (I):

$$[(ER)_x(R'O)_y(HO)_z(R'')_t(SiO_{(4-x-y-z-t)})]_m \quad (I)$$

wherein
ER is an alkyl group substituted with an epoxide group or a cycloalkyl group substituted with an epoxide group,
R' is an alkyl group of 1 to 6 carbon atoms,
R" is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0, x+y+z+t 4, and
m is =1 and/or oligomer or polymer compounds of the compound of formula (I), wherein partial hydrolysis and condensation provides structures containing epoxy side chains (ER), said structures containing up to 5000 monomeric units m;
wherein a total % by mass content of the at least one compound of formula (I) is from 5 to 50% of the total mass of solids of the solvent borne coating composition.

In a first aspect of the third embodiment the at least one compound of formula (I) comprises a compound of formula (Ia):

$$(ER)_x(R'O)_y Si \qquad (Ia)$$

wherein
x is 1 or 2,
y is 2 or 3, and
x+y=4.

In further description of the first aspect of the third embodiment the compound of formula (Ia) comprises at least one epoxide compound selected from the group consisting of Gamma-glycidoxypropyltrimethoxysilane, Gamma-glycidoxypropylmethyldiethoxysilane, Beta-(3,4-epoxycyclohexyl)ethyltrimethoxysilane, and Gamma-glycidoxypropyltrimethoxy silane.

In a second aspect of the third embodiment the at least one compound of formula (I) comprises a compound of formula (Ib):

$$(R'O)_y Si \qquad (Ib)$$

wherein y is 4.

In further description of the second aspect of the third embodiment the compound of formula (Ib) comprises at least one silane compound selected from the group consisting of tetramethoxysilane, tetraethoxysilane, tetrapropoxysilane and tetrahexoxysilane.

In a third aspect of the third embodiment the at least one compound of formula (I) comprises a compound of formula (Ic):

$$(R'O)_y(R")_t Si \qquad (Ic)$$

wherein y is 2 or 3, and t is 1 or 2.

In one special aspect of the third embodiment, the solvent borne 2K clearcoat wet coating contains a hydrophobic fumed silica.

In a further part of this special aspect, the hydrophobic fumed silica has a BET surface area of 150-190 m²/g, a pH of 3.0 to 5.0 and a tapped density of greater than 100 g/l, preferably greater than 150 g/l and most preferably greater than 180 g/l.

In further description of the third embodiment the solvent comprises at least one selected from the group consisting of toluene, xylene, naphtha, heptane, octane, hexane; butyl acetate, isobutyl acetate, butyl propionate, ethyl acetate, isopropyl acetate, amyl acetate, hexyl acetate, heptyl acetate, ethyl propionate, isobutylene isobutyrate, ethylene glycol diacetate, 2-ethoxyethyl acetate, acetone, methyl ethyl ketone, methyl amyl ketone, and methyl isobutyl ketone, methanol, ethanol, isopropanol, n-butanol, 2-butanol, ethylene glycol monobutyl ether, diethylene glycol butyl ether, propylene glycol monomethyl ether acetate, ethylene glycol butyl ether acetate, 3-methoxy n-butyl acetate, N-methyl pyrrolidone (NMP), chlorobromomethane, 1-bromopropane, $C_{12-18}$ n-alkanes, t-butyl acetate, perchloroethylene, benzotrifluoride, p-chlorobenzotrifluoride, 1,2-dichloro-1,1,2-trifluoroethane, dimethoxymethane, 1,1,1,2,2,3,3,4,4-nonafluoro-4-methoxy-butane, 2-(difluoromethoxymethyl)-1,1,1,2,3,3,3-heptafluoropropane, 1-ethoxy-1,1,2,2,3,3,4,4,4-nonafluorobutane, and 2-(ethoxydifluoromethyl)-1,1,1,2,3,3,3-heptafluoropropane.

In further description of the third embodiment the additive comprises at least one selected from the group consisting of titanium dioxide, precipitated silica, pyrogenic silica, talc, mica, stabilizers, solubilizers, diluents, wetting agents, rheology control agents, pigments, dyes, defoamers, dispersing agents, UV absorbers, hindered amine light stabilizers and adhesion promoters.

In a fourth aspect of the third embodiment the wet-coated substrate comprises a catalyst and the catalyst is selected from the group consisting of dibutyltin laurate (DBTL), ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

In a fifth aspect of the third embodiment the substrate comprises a metal or comprises a thermoplastic polymer.

In further description of the fifth aspect the substrate comprises a metal and the metal is selected from the group consisting of aluminum, aluminum alloys, steel, steel alloys, magnesium and magnesium alloys.

In further description of the fifth aspect the metal substrate comprises an electrocoated layer on the metal surface.

In further description of the fifth aspect the substrate comprises a thermoplastic polymer and the thermoplastic polymer is selected from the group consisting of a polycarbonate, a polyolefin, a polyamide, a polyurethane, a polyester, a polycarbonate, an acrylonitrile-butadiene-styrene (ABS) copolymer, and an EPDM rubber.

In further description of the fifth aspect the thermoplastic substrate comprises a primer coating on a surface of the substrate.

In a fourth embodiment, the invention provides a scratch and mar resistant coated substrate obtained by drying and curing the wet coated substrate of the third embodiment, comprising:
optionally, a dried and cured primer coating on the substrate;
a dried and cured basecoat; and
a dried and cured clearcoat, the dried and cured clearcoat comprising:
a crosslinked resin reaction product of an epoxy resin and a carboxylic acid resin;
wherein the crosslinked resin comprises side chain units of silanyl hydroxy ester groups obtained by reaction of a carboxyl group of the carboxylic acid resin or an epoxy group of the epoxy resin with a compound of formula (I):

$$[(ER)_x(R'O)_y(HO)_z(R")_t(SiO_{(4-x-y-z-t)})]_m \qquad (I)$$

wherein
ER is an alkyl group substituted with an epoxide group or a cycloalkyl group substituted with an epoxide group,
R' is an alkyl group of 1 to 6 carbon atoms, R" is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0, x+y+z+t=4, and
m is =1 and/or oligomer or polymer compounds of the compound of formula (I), wherein partial hydrolysis and condensation provides structures containing epoxy side chains (ER), said structures containing up to 5000 monomeric units m; and the dried and cured clearcoat further comprises crosslinking silicate groups.

In a first aspect of the fourth embodiment the crosslinked resin comprises side chain units of silanyl hydroxy ester groups obtained by reaction of a carboxyl group of the carboxylic acid resin or an epoxy group of the epoxy resin with a compound of formula (Ia):

$$(ER)_x(R'O)_y Si \qquad (Ia)$$

wherein
x is 1 or 2,
y is 2 or 3, and
x+y=4.

In a second aspect of the fourth embodiment the crosslinked resin comprises side chain units of silanyl hydroxy ester groups obtained by reaction of a carboxyl group of the carboxylic acid resin or an epoxy group of the epoxy resin with a compound of formula (Ib):

$$(R'O)_y Si \qquad (Ib)$$

wherein y is 4.

In a third aspect of the fourth embodiment the crosslinked resin comprises side chain units of silanyl hydroxy ester groups obtained by reaction of a carboxyl group of the carboxylic acid resin or an epoxy group of the epoxy resin with a compound of formula (Ic):

$$(R'O)_y(R'')_t Si \qquad (Ic)$$

wherein y is 2 or 3, and t is 1 or 2.

In a special aspect of the fourth embodiment the clear coat comprises a hydrophobic fumed silica. In a preferred form of this special aspect, the hydrophobic fumed silica has a BET surface area of 150-190 m²/g, a pH of 3.0 to 5.0 and a tapped density of greater than 100 g/l, preferably greater than 150 g/l and most preferably greater than 180 g/l.

In an explicit aspect the scratch and mar resistant coated substrate according to the fourth embodiment the dried and cured clearcoat further comprises a fumed silica having a tapped density greater than 100 grams/liter.

In a fifth embodiment the invention provides a method to coat a substrate, comprising:
i) preparing a 2K coating composition by combining and mixing an epoxy component (A), comprising:
an epoxy resin;
a solvent;
at least one compound of formula (I):

$$[(ER)_x(R'O)_y(HO)_z(R'')_t(SiO_{(4-x-y-z-t)})]_m \qquad (I)$$

wherein
ER is an alkyl group substituted with an epoxide group or a cycloalkyl group substituted with an epoxide group,
R' is an alkyl group of 1 to 6 carbon atoms,
R" is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0, x+y+z+t=4, and
m is =1 and/or oligomer or polymer compounds of the compound of formula (I), wherein partial hydrolysis and condensation provides structures containing epoxy side chains (ER), said structures containing up to 5000 monomeric units m; and
optionally, at least one non-catalytic additive; and
an acid resin component (B), comprising:
an carboxylic acid resin;
a solvent;
optionally, at least one catalyst; and
optionally, at least one additive;
ii) applying the 2K coating composition to a substrate; and
iii) drying and curing the applied composition on the substrate.

In a special aspect of the fifth embodiment the epoxy resin component (A), the acid resin component (B) or the resin components (A) and (B) of the 2K solvent borne coating composition, comprises a hydrophobic fumed silica. In a preferred form of this special aspect, the hydrophobic fumed silica has a BET surface area of 150-190 m²/g, a pH of 3.0 to 5.0 and a tapped density of greater than 100 g/l, preferably greater than 150 g/l and most preferably greater than 180 g/l.

In a first aspect of the fifth embodiment the 2K coating composition is applied onto a wet basecoat composition and the basecoat and 2K coating composition are simultaneously dried and cured.

In further description of the fifth embodiment the substrate comprises a metal and the metal substrate comprises an electrocoated layer on the metal surface. Additionally, according to this further description the method comprises applying a basecoat layer the electrocoated layer; applying the 2K composition to the wet basecoat composition to obtain wet on wet layers of the basecoat and 2K composition; and drying and curing the wet on wet layers.

In further description of the fifth embodiment the substrate comprises a thermoplastic polymer and the method further comprises:
applying a primer coating to a surface of the thermoplastic substrate;
optionally, drying and curing the primer coating on the thermoplastic substrate;
applying a basecoat layer to the primer coating layer;
applying the 2K composition to the wet basecoat composition to obtain wet on wet layers of the basecoat, the 2K composition and optionally the primer coating; and
drying and curing the wet on wet layers.

In a second aspect of the fifth embodiment and the preceding aspects of the fifth embodiment, the compound of formula (I) is at least one compound of formula (Ia):

$$(ER)_x(R'O)_y Si \qquad (Ia)$$

wherein x is 1 or 2, y is 2 or 3, and x+y=4.

In further description of the second aspect of the fifth embodiment the 2K coating composition is applied onto a wet basecoat composition and the basecoat and 2K coating composition are simultaneously dried and cured.

In further description of the second aspect of the fifth embodiment the substrate comprises a metal and the metal substrate comprises an electrocoated layer on the metal surface. According to this further description the method further comprises applying a basecoat layer to the electrocoated layer; applying the 2K composition to the wet basecoat composition to obtain wet on wet layers of the basecoat and 2K composition; and drying and curing the wet on wet layers.

In further description of the second aspect of the fifth embodiment comprises a thermoplastic polymer and the method further comprises: applying a primer coating to a surface of the thermoplastic substrate; optionally, drying and curing the primer coating on the thermoplastic substrate; applying a basecoat layer to the primer coating layer; applying the 2K composition to the wet basecoat composition to obtain wet on wet layers of the basecoat, the 2K composition and optionally the primer coating; and drying and curing the wet on wet layers.

In a third aspect of the fifth embodiment and the preceding aspects of the fifth embodiment, the compound of formula (I) is at least one compound of formula (Ib):

$(R'O)_y Si$ (Ib)

wherein y is 4.

In further description of the third aspect of the fifth embodiment the 2K coating composition is applied onto a wet basecoat composition and the basecoat and 2K coating composition are simultaneously dried and cured.

In further description of the third aspect of the fifth embodiment the substrate comprises a metal and the metal substrate comprises an electrocoated layer on the metal surface. Additionally, the method further comprises applying a basecoat layer to the electrocoated layer; applying the 2K composition to the wet basecoat composition to obtain wet on wet layers of the basecoat and 2K composition; and drying and curing the wet on wet layers.

In further description of the third aspect of the fifth embodiment the substrate comprises a thermoplastic polymer and the method further comprises:
applying a primer coating to a surface of the thermoplastic substrate;
optionally, drying and curing the primer coating on the thermoplastic substrate;
applying a basecoat layer to the primer coating layer;
applying the 2K composition to the wet basecoat composition to obtain wet on wet layers of the basecoat, the 2K composition and optionally the primer coating; and
drying and curing the wet on wet layers.

In a fourth aspect of the fifth embodiment and the preceding aspects of the fifth embodiment, the compound of formula (I) is at least one compound of formula (Ic):

$(R'O)_y (R'')_t Si$ (Ic)

wherein y is 2 or 3, and t is 1 or 2.

In further description of the fourth aspect of the fifth embodiment the 2K coating composition is applied onto a wet basecoat composition and the basecoat and 2K coating composition are simultaneously dried and cured.

In further description of the fourth aspect of the fifth embodiment the substrate comprises a metal and the metal substrate comprises an electrocoated layer on the metal surface. Additionally, the method further comprises applying a basecoat layer to the electrocoated layer; applying the 2K composition to the wet basecoat composition to obtain wet on wet layers of the basecoat and 2K composition; and drying and curing the wet on wet layers.

In further description of the fourth aspect of the fifth embodiment the substrate comprises a thermoplastic polymer and the method further comprises:
applying a primer coating to a surface of the thermoplastic substrate;
optionally, drying and curing the primer coating on the thermoplastic substrate;
applying a basecoat layer to the primer coating layer;
applying the 2K composition to the wet basecoat composition to obtain wet on wet layers of the basecoat, the 2K composition and optionally the primer coating; and
drying and curing the wet on wet layers.

EXAMPLES

Test Methods:
Polymer Molecular Weight Determination

To determine polymer molecular weights by GPC, fully dissolved molecules of a polymer sample are fractionated on a porous column stationary phase. A 0.1 mol/l acetic acid solution in tetrahydrofuran (THF) is used as the eluent solvent. The stationary phase is combination of Waters Styragel HR 5, HR 4, HR 3, and HR 2 columns. Five milligrams of sample are added to 15 mL of eluent solvent and filtered through a 0.5 µm filter. After filtering, 100 µl of the polymer sample solution is injected into the column at a flow rate of 1.0 ml/min. Separation takes place according to the size of the polymer coils which form in the eluent solvent. Small molecules diffuse into the pores of the column material more frequently and are therefore retarded more than large molecules. Thus, large molecules are eluted earlier than small molecules. The molecular weight distribution, the averages $M_n$ and $M_w$ and the polydispersity $M_w/M_n$ of the polymer samples are calculated with the aid of chromatography software utilizing a calibration curve generated with the EasyValid validation kit which includes a series of unbranched-polystyrene standards of varied molecular weights available from Polymer Standards Service.

Epoxy Equivalent Weight Determination
ASTM D1652 Standard Test Method for Epoxy Content of Epoxy Resins
Solids Content Determination
ASTM D2369 Standard Test Method for Volatile Content of Coatings
Acid Number Determination
ASTM D3643 Standard Test Method for Acid Number of Certain Alkali-Soluble Resins
Tukon Microhardness To evaluate the Tukon microhardness of a coated substrate a Wolpert Wilson Tukon 2100 was utilized. A coated substrate is placed upon the stage of the instrument below the Tukon indenter. The indenter uses a pyramid-shaped diamond tip which applies a 25 g load to the surface of the coated substrate for 18±0.5 seconds. The instrument also has a microscope with a filar micrometer eyepiece. After the indentation is complete, the microscope is used to measure the length of the impression. The instrument calculates the Knoop hardness number (KHN) from the following equation:

$$KHN = \frac{0.025}{L^{(2)} * C_p}$$

Where:
0.025=load applied, kg, to the indenter
L=length of long diagonal of Indentation, mm, and
$C_p$=indenter constant=$7.028 \times 10^{(-2)}$
Crockmeter Dry Scratch Resistance To evaluate scratch and mar resistance an Atlas M38BB Electric Crockmeter was used. A 2"×2" piece of 9 micron 3M 281Q WETODRY™ polishing paper is affixed to the cylindrical acrylic finger of the moveable arm of the Crockmeter with a wire clamp. Coated 4"×12" steel test panels are secured below the moveable arm with a magnet. After ensuring the abrasive is smooth to the panel surface, ten cycles of back and forth (or double rubs) are carried out. The same procedure is repeated a second time on the same panel with a new piece of 3M paper after sliding the panel to an untested area. Upon completion of the test, the 20° gloss is measured for both tested areas and an untested area of the panel using a micro-TRI-gloss gloss meter from BYK. The percent gloss retention is calculated by taking the average of the gloss of the two tested areas and dividing by the gloss of the untested area. To test the reflow property of the coating, the panel is heated to 176° F. (80° C.) in an oven for one hour. After cooling the gloss retention is calculated again to determine if any recovery of gloss is observed.

Storage Stability

To evaluate stability the high shear viscosity of the wet coating samples was monitored over time using a Brookfield CAP-1000+ viscometer. Viscosity measurements were made at 25.0° C. and 100 RPM. Samples were prepared and reduced to package viscosity with solvent naphtha 160/180. An initial viscosity measurement was taken and then the sample was stored in a 1-pint, unlined tinplate can with lid. After storage at room temperature for seven days, samples were removed from the can and the viscosity was measured using the same procedure. The percent viscosity increase was calculated from the quotient of the final and the initial viscosity of the sample.

Opel Carwash

To evaluate wet scratch resistance a Model 494 MC Washability and Scrub Resistance Tester from Erichsen was used. An ASTM standard nylon brush (also available from Erichsen) was charged with a paste made from 5 g of calcium carbonate powder (Sigma Aldrich) and 2.5 g of de-ionized water. Coated 4"×18" steel test panels were secured to the carwash tester and the charged brush was placed in its holder above the panel surface. After attaching the brush holder wires to the holder, 25 and 200 cycles of back and forth over the panel were carried out in two separate paths across the length of the panel without recharging the brush in between tests (the brush was recharged in between panels). Upon completion of the test, the panels were cleaned with de-ionized water and gently wiped dry with a cloth. The 20° gloss was measured for both tested areas and an untested area of the panel using a micro-TRI-gloss gloss meter from BYK. The percent gloss retention was calculated by taking the two tested areas and dividing each by the gloss of the untested area. To test the reflow property of the coating, the panel was heated to 80° C. in an oven for one hour. After cooling the gloss retention was calculated again to determine if any recovery of gloss was observed.

Tapped Density

The tapped density is measured according to ISO 787-11: 1981. In the sense of the present invention the terms "tapped density" and "tamped density" are interchangeable.

Example 1

Preparation of Coated Substrates

Cold rolled steel test panels measuring 4"×12" were used as a substrate. The panels were pretreated with Bondrite® 958 zinc phosphate pretreatment and rinsed with Parcolene® 90 post-rinse, both available from Henkel. The panels were electrocoated with a 0.7-0.8 mil layer of BASF Cathoguard® 800 electrocoat and baked for 20 minutes at 350° F. (176.7°). The panels were sprayed with 2.5-3.0 mil layer of BASF G27AM242 gray powder primer and baked for 20 minutes at 340° F. (171.1° C.). The panels were coated with a 1.0-1.2 mil layer of BASF E54WW310W, a white waterborne basecoat applied to the panel in two coats. After coating with the basecoat the panels received a 5 minute ambient flash and a 6 minute heated flash at 150° F. (65.6° C.). Subsequently a solventborne two-component clearcoat layer of 1.8-2.0 mils was applied to the panel in two coats. After the clearcoat was applied the panels received a 10-minute ambient flash and a 20-minute bake at a temperature of 260° F. (126.7° C.

Table 1 provides the two component clearcoat compositions that were prepared and applied to the substrate:

TABLE 1

| | | Sample | | | | | | |
|---|---|---|---|---|---|---|---|---|
| | | 1 Comparative | 2 Low DDA level | 3 Aerosil R 9200 | 4 3-GPTMS | 5 TEOS | 6 3-GPTMS + TEOS | 7 3-GPTMS + Catalyst |
| Component A | GMA acrylic resin | 19.0 | 19.0 | 17.5 | 13.6 | 19.0 | 13.6 | 13.6 |
| | Hydrophobic fumed silica 1 dispersed in GMA acrylic resin | 6.7 | 6.7 | 6.2 | 6.7 | 6.7 | 6.7 | 6.7 |
| | 30% Solution of Aerosil R 9200 in methoxypropyl acetate | 0.0 | 0.0 | 4.0 | 0.0 | 0.0 | 0.0 | 0.0 |
| | Polyamide wax dispersed in GMA acrylic resin | 3.0 | 3.0 | 2.8 | 3.0 | 3.0 | 3.0 | 3.0 |
| | High imino melamine resin | 9.6 | 9.6 | 8.8 | 9.6 | 9.6 | 9.6 | 9.6 |
| | UVA (30% Solution) | 1.1 | 1.1 | 1.0 | 1.1 | 1.1 | 1.1 | 1.1 |
| | HALS | 0.4 | 0.4 | 0.4 | 0.4 | 0.4 | 0.4 | 0.4 |
| | Phosphite antioxidant | 0.4 | 0.4 | 0.4 | 0.4 | 0.4 | 0.4 | 0.4 |
| | Polyacrylate flow additive 1 | 0.4 | 0.4 | 0.4 | 0.4 | 0.4 | 0.4 | 0.4 |
| | Polyacrlate flow additive 2 | 0.1 | 0.1 | 0.1 | 0.1 | 0.1 | 0.1 | 0.1 |
| | Polyacylate anti-popping additive | 0.2 | 0.2 | 0.2 | 0.2 | 0.2 | 0.2 | 0.2 |
| | Solvent | 9.1 | 9.1 | 8.4 | 9.4 | 5.7 | 6.0 | 9.4 |
| | 3-Glycidoxypropyltrimethoxysilane | 0.0 | 0.0 | 0.0 | 5.1 | 0.0 | 5.1 | 5.1 |
| | Coat-O-Sil MP200 | 0.0 | 0.0 | 0.0 | 0.0 | 0.0 | 0.0 | 0.0 |
| | Tetraethylorthosilicate | 0.0 | 0.0 | 0.0 | 0.0 | 3.4 | 3.4 | 0.0 |

TABLE 1-continued

| Component B | | | | | | | | |
|---|---|---|---|---|---|---|---|---|
| | Acid-functional acrylic resin | 6.7 | 6.7 | 6.2 | 7.6 | 6.7 | 7.6 | 7.6 |
| | Acid-functional polyester resin | 31.1 | 31.1 | 28.6 | 35.4 | 31.1 | 35.4 | 35.4 |
| | Bismuth carboxylate catalyst | 0.0 | 0.0 | 0.0 | 0.0 | 0.0 | 0.0 | 0.1 |
| | Dimethyldodecylamine | 1.7 | 0.2 | 1.6 | 1.7 | 1.7 | 1.7 | 1.7 |
| | Solvent | 10.5 | 12.0 | 13.7 | 5.3 | 10.5 | 5.3 | 5.2 |
| | Sum Component A | 50.0 | 50.0 | 50.0 | 50.0 | 50.0 | 50.0 | 50.0 |
| | Sum Component B | 50.0 | 50.0 | 50.0 | 50.0 | 50.0 | 50.0 | 50.0 |
| | Sum A + B | 100.0 | 100.0 | 100.0 | 100.0 | 100.0 | 100.0 | 100.0 |

| | | Sample | | | | |
|---|---|---|---|---|---|---|
| | Composition | 8 TEOS + Catalyst | 9 3-GPTMS + TEOS + Catalyst | 10 3-GPTMS + TEOS + Catalyst + Aerosil R 9200 | 11 MP200 | 12 MP200 + Catalyst |
| Component A | GMA acrylic resin | 19.0 | 13.6 | 12.5 | 13.6 | 13.6 |
| | Hydrophobic fumed silica 1 dispersed in GMA acrylic resin | 6.7 | 6.7 | 6.2 | 6.7 | 6.7 |
| | 30% Solution of Aerosil R 9200 in methoxypropyl acetate | 0.0 | 0.0 | 4.0 | 0.0 | 0.0 |
| | Polyamide wax dispersed in GMA acrylic resin | 3.0 | 3.0 | 2.8 | 3.0 | 3.0 |
| | High imino melamine resin | 9.6 | 9.6 | 8.8 | 9.6 | 9.6 |
| | UVA (30% Solution) | 1.1 | 1.1 | 1.0 | 1.1 | 1.1 |
| | HALS | 0.4 | 0.4 | 0.4 | 0.4 | 0.4 |
| | Phosphite antioxidant | 0.4 | 0.4 | 0.4 | 0.4 | 0.4 |
| | Polyacrylate flow additive 1 | 0.4 | 0.4 | 0.4 | 0.4 | 0.4 |
| | Polyacrlate flow additive 2 | 0.1 | 0.1 | 0.1 | 0.1 | 0.1 |
| | Polyacylate anti-popping additive | 0.2 | 0.2 | 0.2 | 0.2 | 0.2 |
| | Solvent | 5.7 | 6.0 | 5.5 | 9.4 | 9.4 |
| | 3-Glycidoxypropyltrimethoxysilane | 0.0 | 5.1 | 4.7 | 0.0 | 0.0 |
| | Coat-O-Sil MP200 | 0.0 | 0.0 | 0.0 | 5.1 | 5.1 |
| | Tetraethylorthosilicate | 3.4 | 3.4 | 3.1 | 0.0 | 0.0 |
| Component B | Acid-functional acrylic resin | 6.7 | 7.6 | 7.0 | 7.6 | 7.6 |
| | Acid-functional polyester resin | 31.1 | 35.4 | 32.6 | 35.4 | 35.4 |
| | Bismuth carboxylate catalyst | 0.1 | 0.1 | 0.1 | 0.0 | 0.1 |
| | Dimethyldodecylamine | 1.7 | 1.7 | 1.6 | 1.7 | 1.7 |
| | Solvent | 10.4 | 5.2 | 8.8 | 5.3 | 5.2 |
| | Sum Component A | 50.0 | 50.0 | 50.0 | 50.0 | 50.0 |
| | Sum Component B | 50.0 | 50.0 | 50.0 | 50.0 | 50.0 |
| | Sum A + B | 100.0 | 100.0 | 100.0 | 100.0 | 100.0 |

The two component clearcoat composition generally comprised a component A and a component B which were mixed immediately before spraying. The component A generally comprised a GMA acrylic resin, an epoxy-functional acrylic copolymer (with glycidyl methacrylate as the epoxy monomer), having a weight average molecular weight of 3500, an epoxy equivalent weight of 283, and a solids content of 58% by weight. The component A may have further comprised a hydrophobic fumed silica dispersed in the GMA acrylic resin, a polyamide wax dispersed in the GMA acrylic resin, a high imino melamine resin, a solid UV absorber in a 30% by weight solution (Tinuvin® 928), a liquid hindered amine light stabilizer (Tinuvin® 123), a phosphite antioxidant, two polyacrylate flow additives, a polyacrylate anti-popping additive, and a solvent (Solvent Naphtha 160/180). Additionally, amounts of 3-glycidoxypropyltrimethoxysilane, Coat-o-Sil MP200 (pre-hydrolyzed 3-GPTMS) and tetraethylorthosilicate were added to the component A. The component B generally comprised an acid-functional acrylic resin, a copolymer containing carboxylic acid groups, having a weight average molecular weight of 3500, an acid number of 145, and a solids content of 55% and an acid-functional polyester resin, a polyester containing carboxylic acid groups, having a weight average molecular weight of 1850, an acid number of 180, and a solids content of 62%. The component B may have further comprised a tertiary amine catalyst (dimethyldodecylamine), a bismuth carboxylate catalyst (King Industries K-KAT® XK-651), and a solvent (Solvent Naphtha 160/180).

Example 2

Tukon Hardness and Crockmeter Dry Scratch Resistance of Coated Substrates

The coated substrates of Example 1 were evaluated for Tukon hardness and crockmeter scratch and mar resistance.

Table 2 summarizes the test results of the Tukon microhardness and Crockmeter dry scratch resistance of the coated substrates from Example 1.

TABLE 2

| Sample | Tukon Hardness | Initial Gloss | Final Gloss | % Gloss Retention | Gloss After Reflow | % Gloss Retention After Reflow |
|---|---|---|---|---|---|---|
| 1 (comparative) | 10.0 | 89.0 | 55.7 | 63% | 70.5 | 79% |
| 2 (low DDA level) | 7.0 | 89.8 | 39.0 | 43% | 51.2 | 57% |
| 3 (Aerosil R 9200) | 8.8 | 87.9 | 67.8 | 77% | 79.3 | 90% |
| 4 (3-GPTMS) | 10.6 | 89.0 | 57.3 | 64% | 76.4 | 86% |
| 5 (TEOS) | 10.7 | 89.6 | 52.4 | 58% | 71.3 | 80% |
| 6 (3-GPTMS + TEOS) | 11.0 | 87.6 | 61.6 | 70% | 78.4 | 89% |
| 7 (3-GPTMS + Catalyst) | 11.7 | 88.9 | 62.6 | 70% | 80.8 | 91% |
| 8 (TEOS + Catalyst) | 11.7 | 89.5 | 63.6 | 71% | 76.9 | 86% |
| 9 (3-GPTMS + TEOS + Catalyst) | 11.4 | 88.8 | 63.6 | 72% | 81.2 | 91% |
| 10 (3-GPTMS + TEOS + Catalyst + Aerosil R 9200) | 8.1 | 88.3 | 78.9 | 89% | 86.7 | 98% |
| 11 (Coat-o-Sil MP200) | 10.5 | 88.3 | 61.2 | 69% | 79.3 | 90% |
| 12 (Coat-o-Sil MP200 + Catalyst) | 10.8 | 88.8 | 61.9 | 70% | 78.8 | 89% |

Example 3

Preparation of Clearcoat Compositions

Clearcoat compositions were prepared and stored in sealed, unlined, tinplate cans to evaluate shelf storage stability. The clearcoat compositions prepared included samples of clearcoat component A alone, clearcoat component B alone and clearcoat components A and B mixed.

Table 3 provides the clearcoat compositions that were prepared for storage stability testing:

TABLE 3

| Composition | 1 Comparative (Mixed A + B) | 2 Low DDA level (Mixed A + B) | 3 3-GPTMS (Mixed A + B) | 4 TEOS (Mixed A + B) | 5 MP200 (Mixed A + B) | 6 Comparative (Component A) | 7 3-GPTMS (Component A) |
|---|---|---|---|---|---|---|---|
| GMA acrylic resin | 19.0 | 19.0 | 13.6 | 19.0 | 13.6 | 38.0 | 27.2 |
| Hydrophobic fumed silica dispersed in GMA acrylic resin | 6.7 | 6.7 | 6.7 | 6.7 | 6.7 | 13.4 | 13.4 |
| Polyamide wax dispersed in GMA acrylic resin | 3.0 | 3.0 | 3.0 | 3.0 | 3.0 | 6.0 | 6.0 |
| High imino melamine resin | 9.6 | 9.6 | 9.6 | 9.6 | 9.6 | 19.2 | 19.2 |
| UVA (30% Solution) | 1.1 | 1.1 | 1.1 | 1.1 | 1.1 | 2.2 | 2.2 |
| HALS | 0.4 | 0.4 | 0.4 | 0.4 | 0.4 | 0.8 | 0.8 |
| Phosphite antioxidant | 0.4 | 0.4 | 0.4 | 0.4 | 0.4 | 0.8 | 0.8 |
| Polyacrylate flow additive 1 | 0.4 | 0.4 | 0.4 | 0.4 | 0.4 | 0.8 | 0.8 |
| Polyacrlate flow additive 2 | 0.1 | 0.1 | 0.1 | 0.1 | 0.1 | 0.2 | 0.2 |
| Polyacylate anti-popping additive | 0.2 | 0.2 | 0.2 | 0.2 | 0.2 | 0.4 | 0.4 |
| 3-Glycidoxypropyltrimethoxysilane | 0.0 | 0.0 | 5.1 | 0.0 | 0.0 | 0.0 | 20.4 |
| Coat-os-sil MP200 | 0.0 | 0.0 | 0.0 | 0.0 | 5.1 | 0.0 | 0.0 |
| Tetraethylorthosilicate | 0.0 | 0.0 | 0.0 | 3.4 | 0.0 | 0.0 | 0.0 |
| Acid-functional acrylic resin | 6.7 | 6.7 | 7.6 | 6.7 | 7.6 | 0.0 | 0.0 |
| Acid-functional polyester resin | 31.1 | 31.1 | 35.4 | 31.1 | 35.4 | 0.0 | 0.0 |
| Dimethyldodecylamine | 1.7 | 0.2 | 1.7 | 1.7 | 1.7 | 0.0 | 0.0 |
| Sum | 80.4 | 78.9 | 85.3 | 83.8 | 85.3 | 81.8 | 91.4 |

| Composition | 8 TEOS (Component A) | 9 MP200 (Component A) | 10 Comparative (Component B) | 11 3-GPTMS (Component B) | 12 TEOS (Component B) | 13 MP200 (Component B) |
|---|---|---|---|---|---|---|
| GMA acrylic resin | 38.0 | 27.2 | 0.0 | 0.0 | 0.0 | 0.0 |
| Hydrophobic fumed silica dispersed in GMA acrylic resin | 13.4 | 13.4 | 0.0 | 0.0 | 0.0 | 0.0 |
| Polyamide wax dispersed in GMA acrylic resin | 6.0 | 6.0 | 0.0 | 0.0 | 0.0 | 0.0 |
| High imino melamine resin | 19.2 | 19.2 | 0.0 | 0.0 | 0.0 | 0.0 |
| UVA (30% Solution) | 2.2 | 2.2 | 0.0 | 0.0 | 0.0 | 0.0 |
| HALS | 0.8 | 0.8 | 0.0 | 0.0 | 0.0 | 0.0 |
| Phosphite antioxidant | 0.8 | 0.8 | 0.0 | 0.0 | 0.0 | 0.0 |

TABLE 3-continued

| | | | | | | |
|---|---|---|---|---|---|---|
| Polyacrylate flow additive 1 | 0.8 | 0.8 | 0.0 | 0.0 | 0.0 | 0.0 |
| Polyacrlate flow additive 2 | 0.2 | 0.2 | 0.0 | 0.0 | 0.0 | 0.0 |
| Polyacylate anti-popping additive | 0.4 | 0.4 | 0.0 | 0.0 | 0.0 | 0.0 |
| 3-Glycidoxypropyltrimethoxysilane | 0.0 | 0.0 | 0.0 | 0.0 | 0.0 | 0.0 |
| Coat-os-sil MP200 | 0.0 | 20.4 | 0.0 | 20.4 | 0.0 | 20.4 |
| Tetraethylorthosilicate | 13.6 | 0.0 | 0.0 | 0.0 | 13.6 | 0.0 |
| Acid-functional acrylic resin | 0.0 | 0.0 | 13.4 | 15.2 | 13.4 | 15.2 |
| Acid-functional polyester resin | 0.0 | 0.0 | 62.2 | 70.8 | 62.2 | 70.8 |
| Dimethyldodecylamine | 0.0 | 0.0 | 3.4 | 3.4 | 3.4 | 3.4 |
| Sum | 95.4 | 91.4 | 79.0 | 109.8 | 92.6 | 109.8 |

To evaluate storage stability, all of the samples were reduced with solvent naphtha 160/180 to a target viscosity of 60 cP for the mixed component A and B samples and the component B alone samples and to 40 cP for the component A alone samples. All viscosity measurements were made with a Brookfield CAP-1000+ viscometer. Viscosity measurements were taken at 25.0° C. and 100 RPM.

Example 4

Storage Stability of Clearcoat Compositions

The clearcoat compositions of Example 3 were evaluated for stability after a period of one week of shelf storage.

Table 4 summarizes the room temperature stability test results of the coating compositions from Example 3.

TABLE 4

| Sample | Initial Viscosity | Final Viscosity | % Viscosity Increase |
|---|---|---|---|
| 1 Comparative (Mixed A + B) | 57.2 | 100.5 | 76% |
| 2 low DDA level (Mixed A + B) | 56.5 | 64.5 | 14% |
| 3 3-GPTMS (Mixed A + B) | 58.5 | 158.4 | 171% |
| 4 TEOS (Mixed A + B) | 59.8 | 115.1 | 92% |
| 5 Coat-o-Sil MP200 (Mixed A + B) | 57.5 | 175.1 | 205% |
| 6 Comparative (Component A) | 39.2 | 40.7 | 4% |
| 7 3-GPTMS (Component A) | 40.0 | 40.7 | 2% |
| 8 TEOS (Component A) | 40.7 | 44.7 | 10% |
| 9 Coat-o-Sil MP200 (Component A) | 40.5 | 40.5 | 0% |
| 10 Comparative (Component B) | 56.5 | 56.2 | −1% |
| 11 3-GPTMS (Component B) | 58.7 | 104.7 | 78% |
| 12 TEOS (Component B) | 55.0 | 59.8 | 9% |
| 13 Coat-o-Sil MP200 (Component B) | 55.3 | 117.4 | 112% |

As indicated, the two-component clearcoat compositions of the present disclosure are suitable for increasing the hardness and scratch and mar resistance of coated substrates. Additionally, and unexpectedly, the two component clearcoat compositions of the present disclosure are suitable for increasing the hardness and scratch and mar resistance of coated substrates while also providing an option for long-term storage stability by isolating the reactive silane components in the component A of the coating composition.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present invention is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A 2K solvent borne coating system, comprising:
an epoxy component (A), comprising:
i) an epoxy resin, wherein the epoxy resin is an acrylic resin having an epoxy group in a side chain;
ii) a solvent;
iii) at least one compound of formula (I):

$$[(ER)_x(R'O)_y(HO)_z(R'')_t(SiO_{(4-x-y-z-t)})]_m \quad (I)$$

wherein
ER is an alkyl group substituted with an epoxide group or a cycloalkyl group substituted with an epoxide group,
R' is an alkyl group of 1 to 6 carbon atoms,
R" is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0, x+y+z+t=4, and m is =1 and/or oligomer or polymer compounds of the compound of formula (I), wherein partial hydrolysis and condensation provides structures containing epoxy side chains (ER), said structures containing up to 5000 monomeric units m; and
iv) optionally, at least one additive; and
an acid resin component (B), comprising:
a carboxylic acid resin including carboxylic acid groups;
a solvent;
optionally, at least one catalyst; and
optionally, at least one additive.

2. The 2K solvent borne coating system according to claim 1, wherein the at least one compound of formula (I) comprises at least one compound selected from the group consisting of formula (Ia), (Ib) and (Ic):

$$(ER)_x(R'O)_y Si \quad (Ia)$$

wherein x is 1 or 2, y is 2 or 3, and x+y=4;

$$(R'O)_y Si \quad (Ib)$$

wherein y is 4; and $$(R'O)_y(R'O)_y(R'')_t Si \quad (Ic)$$

wherein y is 2 or 3, and t is 1 or 2.

3. The 2K solvent borne coating system according to claim 1, wherein the acid resin component (B), comprises at least one catalyst and the catalyst is selected from the group consisting of bismuth neodecanoate, dibutyltin laurate (DBTL), ammonium fluoride, sodium fluoride, acrylic acid, formic acid, acetic acid, an acid phosphate, an aluminum alkoxide, a titanium alkoxide, a zirconium alkoxide, a chelate of aluminum, a chelate of titanium, and a chelate of zirconium.

4. The 2K solvent borne coating system according to claim 1, wherein the side chain of the epoxy group of the epoxy resin is obtained by copolymerization of (meth) acrylic monomers and glycidyl group containing unsaturated monomers.

5. A 2K solvent borne coating composition obtained by combining and mixing components (A) and (B) of the coating system according to claim 1, comprising:
a an epoxy resin, wherein the epoxy resin is an acrylic resin having an epoxy group in a side chain;
a carboxylic acid resin including carboxylic acid groups;
a solvent;
optionally, a catalyst;
optionally, an additive; and
at least one compound of formula (I):

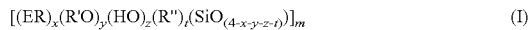  (I)

wherein
ER is an alkyl group substituted with an epoxide group or a cycloalkyl group substituted with an epoxide group,
R' is an alkyl group of 1 to 6 carbon atoms,
R" is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0, x+y+z+t=4, and
m is =1, and/or oligomer or polymer compounds of the compound of formula (I), wherein partial hydrolysis and condensation provides structures containing epoxy side chains (ER), said structures containing up to 5000 monomeric units m;
wherein a total % by mass content of the at least one compound of formula (I) is from 5 to 50% of a total mass of solids of the solvent borne coating composition.

6. The solvent borne coating composition according to claim 5, wherein the at least one compound of formula (I) comprises at least one compound selected from the group consisting of formula (Ia), (Ib) and (Ic):

$(ER)_x(R'O)_y Si$  (Ia)

wherein x is 1 or 2, y is 2 or 3, and x+y=4;

$(R'O)_y Si$  (Ib)

wherein y is 4; and $(R'O)_y(R")_t Si$  (Ic)

wherein y is 2 or 3, and t is 1 or 2.

7. A wet-coated substrate, comprising:
a substrate;
optionally, a primer coating on the substrate;
a wet basecoat coating; and
a solvent borne 2K clearcoat wet coating on the wet basecoat coating;
wherein the solvent borne 2K clearcoat wet coating is the solvent borne coating composition according to claim 5.

8. The wet-coated substrate according to claim 7, wherein the at least one compound of formula (I) comprises at least one compound selected from the group consisting of formula (Ia), (Ib) and (Ic):

$(ER)_x(R'O)_y Si$  (Ia)

wherein x is 1 or 2, y is 2 or 3, and x+y=4;

$(R'O)_y Si$  (Ib)

wherein y is 4; and $(R'O)_y(R")_t Si$  (Ic)

wherein y is 2 or 3, and t is 1 or 2.

9. The wet-coated substrate according to claim 7, wherein the at least one compound of formula (I) comprises a compound selected from the group consisting of Gamma-glycidoxypropyltrimethoxysilane, Gamma-glycidoxypropylmethyldiethoxysilane, Beta-(3,4-epoxycyclohexyl)ethyltrimethoxysilane, and Gamma-glycidoxypropyltrimethoxy silane.

10. The wet-coated substrate according to claim 7, wherein the at least one compound of formula (I) comprises a compound selected from the group consisting of tetramethoxysilane, tetraethoxysilane, tetrapropoxysilane and tetrahexoxysilane.

11. The wet-coated substrate according to claim 7, wherein the substrate comprises a metal or comprises a thermoplastic polymer.

12. A scratch and mar resistant coated substrate obtained by drying and curing the wet-coated substrate of claim 7, comprising:
optionally, a dried and cured primer coating on the substrate;
a dried and cured basecoat; and
a dried and cured clearcoat, the dried and cured clearcoat comprising:
a crosslinked resin reaction product of an epoxy resin and a carboxylic acid resin, wherein the epoxy resin is an acrylic resin having an epoxy group in a side chain, and wherein the carboxylic acid resin includes carboxylic acid groups;
wherein the crosslinked resin comprises side chain units of silanyl hydroxy ester groups obtained by reaction of a carboxyl group of the carboxylic acid groups or the epoxy group of the epoxy resin with a compound of formula (I):

  (I)

wherein
ER is an alkyl group substituted with an epoxide group or a cycloalkyl group substituted with an epoxide group,
R' is an alkyl group of 1 to 6 carbon atoms,
R" is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0,
x+y+z+t=4, and
m is =1, and/or oligomer or polymer compounds of the compound of formula (I), wherein partial hydrolysis and condensation provides structures containing epoxy side chains (ER), said structures containing up to 5000 monomeric units m; and
wherein the dried and cured clearcoat further comprises crosslinking silicate groups.

13. The scratch and mar resistant coated substrate according to claim 12, wherein the at least one compound of formula (I) comprises at least one compound selected from the group consisting of formula (Ia), (Ib) and (Ic):

$(ER)_x(R'O)_y Si$  (Ia)

wherein x is 1 or 2, y is 2 or 3, and x+y=4;

$$(R'O)_y Si \quad (Ib)$$

wherein y is 4; and $$(R'O)_y(R'')_t Si \quad (Ic)$$

wherein y is 2 or 3, and t is 1 or 2.

14. A method to coat a substrate, comprising:
i) preparing a 2K coating composition by combining and mixing an epoxy component (A), comprising:
an epoxy resin, wherein the epoxy resin is an acrylic resin having an epoxy group in a side chain;
a solvent;
at least one compound of formula (I):

$$[(ER)_x(R'O)_y(HO)_z(R'')_t(SiO_{(4-x-y-z-t)})]_m \quad (I)$$

wherein
ER is an alkyl group substituted with an epoxide group or a cycloalkyl group substituted with an epoxide group,
R' is an alkyl group of 1 to 6 carbon atoms,
R'' is an alkyl group of 1 to 20 carbon atoms which may be linear, branched or cyclic,
x is a number from 0 to 2,
y is a number from 0 to 4,
z is a number from 0 to 3,
t is a number from 0 to 2,
at least one of x and y is greater than 0,
x+y+z+t=4, and
m is =1, and/or oligomer or polymer compounds of the compound of formula (I), wherein partial hydrolysis and condensation provides structures containing epoxy side chains (ER), said structures containing up to 5000 monomeric units m; and
optionally, at least one additive; and
an acid resin component (B), comprising:
a carboxylic acid resin including carboxylic acid groups;
a solvent;
optionally, at least one catalyst; and
optionally, at least one additive;
ii) applying the 2K coating composition to the substrate; and
iii) drying and curing the applied composition on the substrate.

15. The method according to claim 14, wherein the 2K coating composition is applied onto a wet basecoat composition and the basecoat composition and 2K coating composition are simultaneously dried and cured.

* * * * *